US009345961B2

(12) United States Patent
Ryan

(10) Patent No.: US 9,345,961 B2
(45) Date of Patent: May 24, 2016

(54) ELECTRONIC GAMING DEVICE WITH EXPLOSIVE SCATTERS

(71) Applicant: Cadillac Jack Inc., Duluth, GA (US)

(72) Inventor: Timothy Curtis Ryan, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 5 days.

(21) Appl. No.: 13/750,880

(22) Filed: Jan. 25, 2013

(65) Prior Publication Data

US 2013/0344935 A1 Dec. 26, 2013

Related U.S. Application Data

(63) Continuation of application No. 13/531,837, filed on Jun. 25, 2012, now Pat. No. 8,939,832.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.

CPC ............ *A63F 13/005* (2013.01); *G07F 17/323* (2013.01); *G07F 17/3204* (2013.01); *G07F 17/3239* (2013.01); *G07F 17/3251* (2013.01); *G07F 17/3258* (2013.01); *G07F 17/3267* (2013.01); *G07F 17/34* (2013.01)

(58) Field of Classification Search

CPC .............. G07F 17/326; G07F 17/3267; G07F 17/3286; G07F 17/3251; G07F 17/3239

USPC ...................................................... 463/16, 20

See application file for complete search history.

(56) References Cited

U.S. PATENT DOCUMENTS

2012/0046089 A1* 2/2012 Kemper .......................... 463/20

* cited by examiner

*Primary Examiner* — Milap Shah
*Assistant Examiner* — Jason Pinheiro
(74) *Attorney, Agent, or Firm* — Weide & Miller, Ltd.

(57) ABSTRACT

Examples disclosed herein relate to systems and methods, which allow a player, the gaming device, and/or the gaming system to utilize exploding scatters. The electronic gaming device and/or method may utilize a plurality of reels. The plurality of reels may include one or more areas. The electronic gaming device and/or method may utilize a memory and a processor. The processor may generate one or more symbols to be located in the one or more areas. The one or more symbols may include a first expanding scatter symbol and a first dormant scatter symbol. The processor may modify the first dormant scatter symbol into an award value based on a first interaction determination.

20 Claims, 18 Drawing Sheets

ELECTRONIC GAMING DEVICE WITH EXPLOSIVE SCATTERS

CROSS-REFERENCE TO RELATED PATENT APPLICATION

This application is a continuation of prior application Ser. No. 13/531,837 entitled "ELECTRONIC GAMING DEVICE WITH EXPLOSIVE SCATTERS", filed on Jun. 25, 2012, which is incorporated herein by reference in its entirety.

BACKGROUND

1. Field

The subject matter disclosed herein relates to an electronic gaming device. More specifically, the disclosure relates to an electronic gaming device that provides gaming options with explosive scatters.

2. Information

The gaming industry has numerous casinos located both worldwide and in the United States. A client of a casino or other gaming entity can gamble via various games of chance. For example, craps, roulette, baccarat, blackjack, and electronic games (e.g., slot machines) where a person may gamble on an outcome.

Reels of an electronic gaming device (e.g., a slot machine) are utilized to display various symbols, which are utilized to determine whether a specific spin/activation of a game has resulted in a winning combination of these symbols. A new way of delivering this game play includes providing wagering gaming options, which may include explosive scatters. In this disclosure, the gaming device and/or the gaming system may provide more excitement by utilizing explosive scatters.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
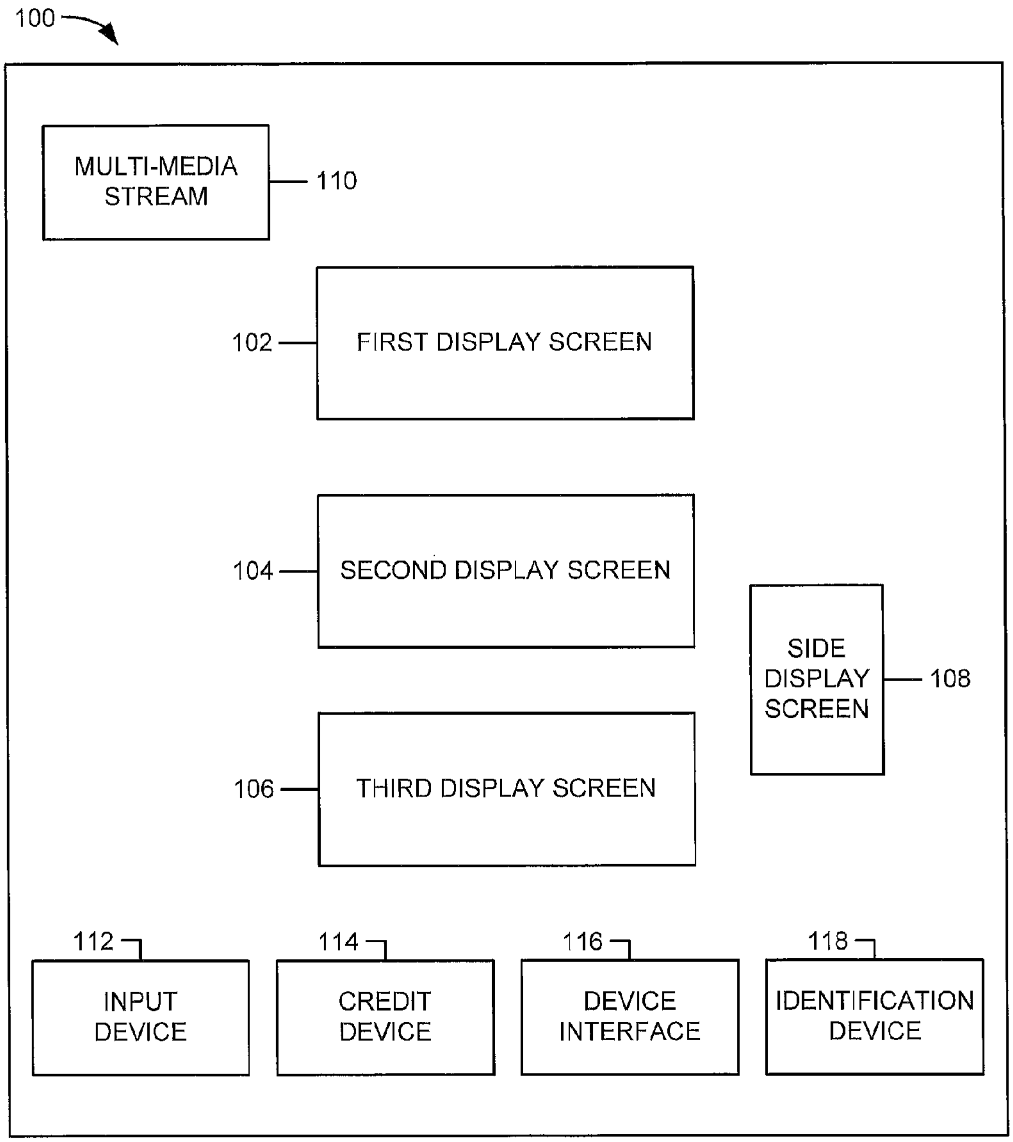
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, or any combination thereof.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, or any combination thereof.

Device interface 116 may be utilized to connect a player to electronic gaming device 100 through a mobile device, card, keypad, identification device 118, or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have row rearrangement gaming options only. Therefore, no column rearrangement options would be presented. In another example, the player may only want options related to column rearrangements. Therefore, no row rearrangement options would be presented. In another example, the player may only want two row options (e.g., top row and bottom row) to be presented. Therefore, no other row or column options would be presented. In another example, a player may want to have 3D gaming options only. Therefore, no 2D games would be presented. In another example, the player may only want 2D options. Therefore, no 3D gaming options would be presented. In another example, the player may only want explosive scatter games presented. Therefore, only games with the exploding scatter options would be presented. In another example, the player may not want game play options, which contain blocking symbols. Therefore, no blocking game play options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are combined they complete one image. Electronic gaming device 100 may stream or play prerecorded multi-media 110, and the media may be displayed on first display screen 102.

Figure 2:
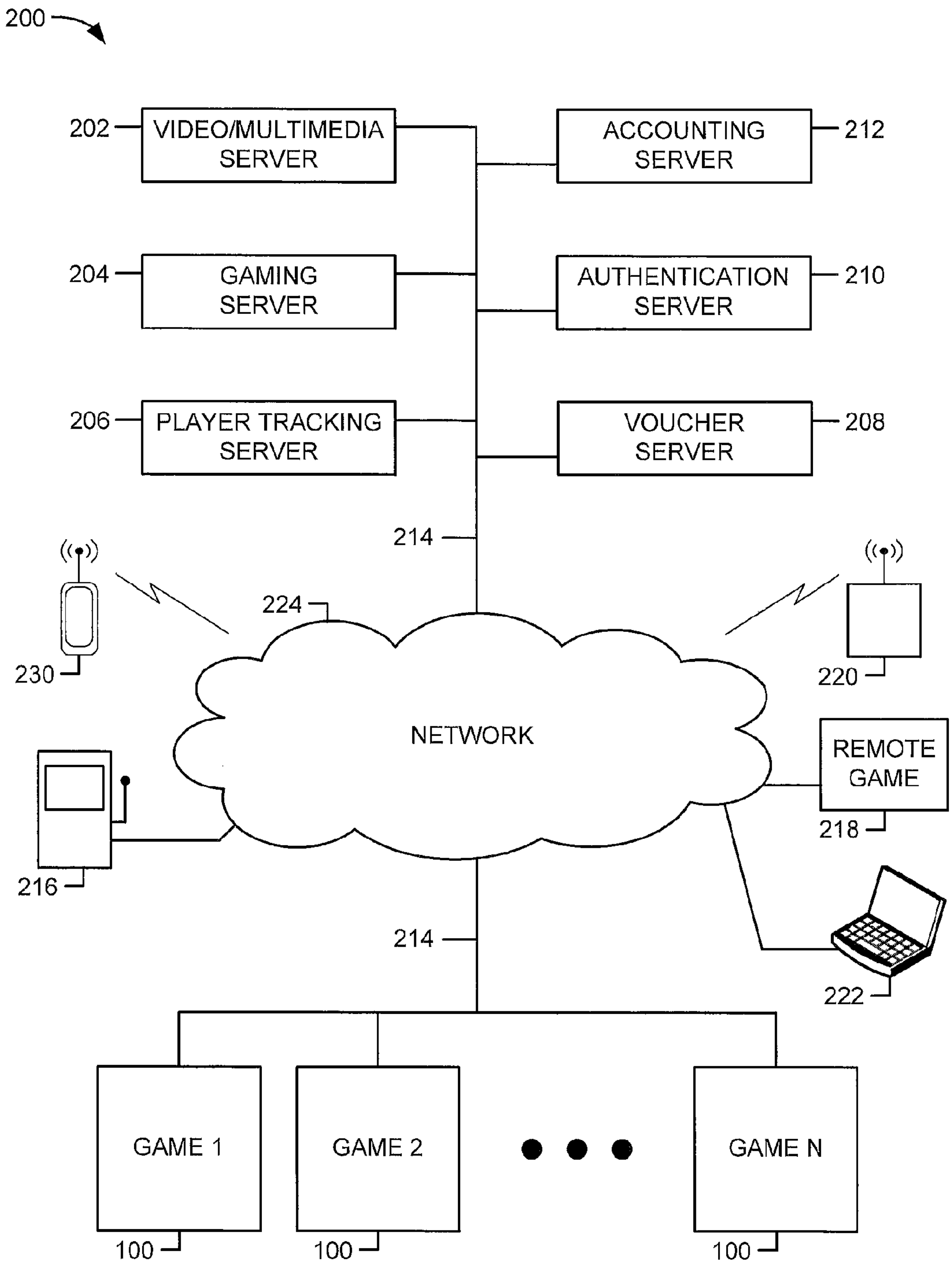
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multi-media server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/Multi-media server 202 may transmit these video streams via network link 214 and/or network 224.

For example, a remote gaming device at the same location may be a casino with multiple casino floors, a casino that allows wagering activities to take place from hotel rooms within the casino, a casino that may allow wagering activities to take place from the pool area, etc. In another example, the remote devices may be at another location, such a progressive link to another casino, or a casino corporation that owns numerous casinos (e.g. MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for player's tracked outcomes.

Network connection 214 may be used for communication between dedicated servers, thin clients, thick clients, back-office accounting systems, etc.

Laptop computer 222 and/or any other electronic device (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (such as cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, and/or any combination thereof may also be part of network 224.

Figure 3:
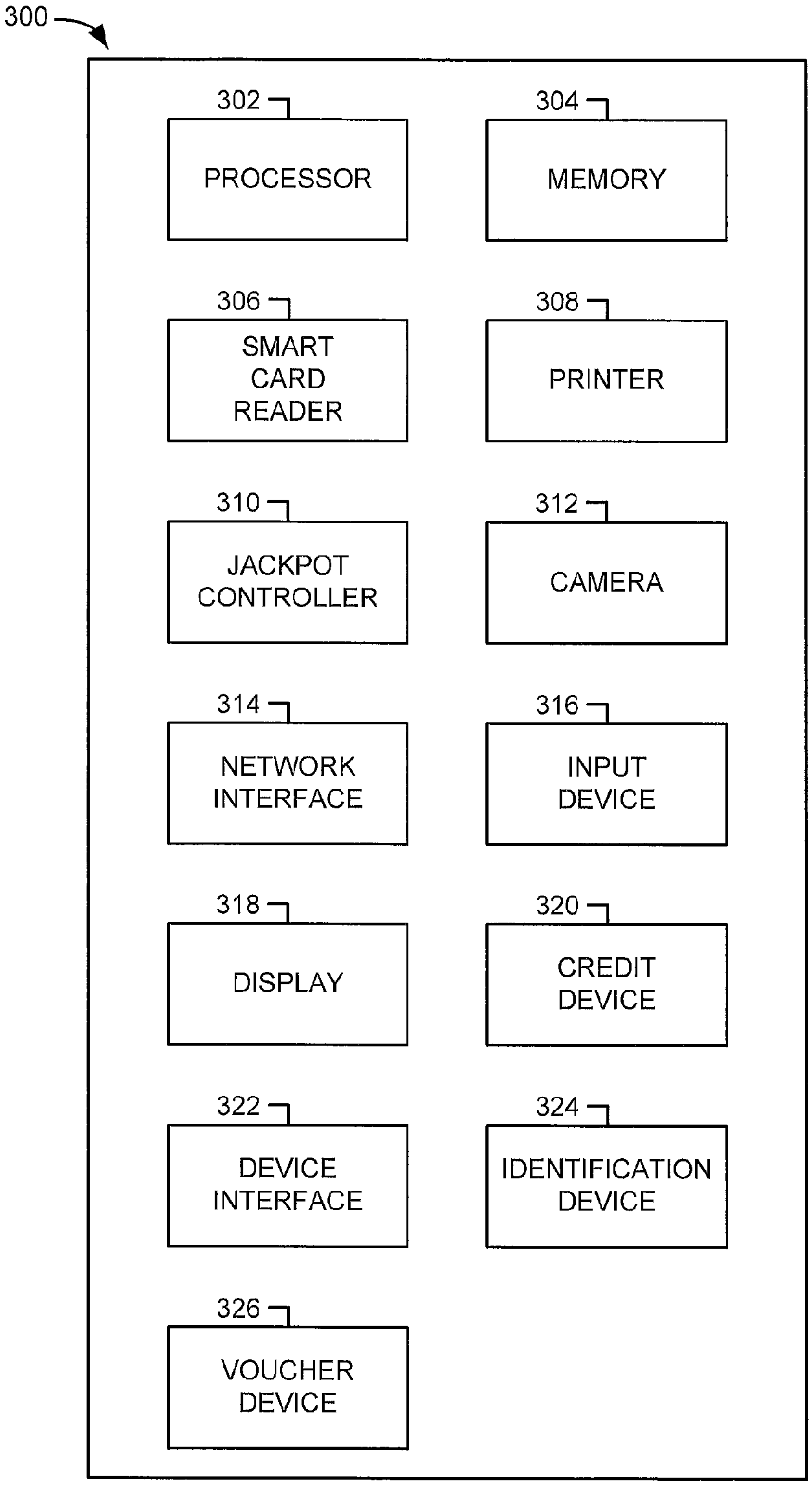
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and may use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and/or user interfaces to enable communication with all gaming elements. For example, processor 302 may interface with memory 304 to access a player's mobile device through device interface 322, which may display contents onto display 318. Processor 302 may generate a voucher based on a wager confirmation, which may be received by an input device, a server, a mobile device, and/or any combination thereof. A voucher device may generate, print, transmit, and/or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308 and/or video or pictures captured by camera 312 may be saved and stored on memory 304. Memory 304 may include a confirmation module, which may authenticate a value of a voucher and/or the validity of the voucher. The processor may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory such as, read-only memory ("ROM"), erasable programmable read-only memory ("EPROM"), electrically erasable programmable read-only memory ("EEPROM"), flash memory ("NVRAM"), or Nano-RAM (carbon nanotube random access memory), and/or any combination thereof.

Memory 304 may also be volatile semiconductor memory such as, dynamic random access memory ("DRAM") or static random access memory ("SRAM"), and/or any combination thereof.

Memory 304 may also be a data storage device such as, a hard disk drive, an optical disk drive such as, CD, DVD, or Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, and for the read-write storage of the data structure known as "the stack", and/or any combination thereof.

Memory 304 may be used to store the read-only pay table information for which symbol combinations on a given payline, which result in a win (payout) are established for games of chance such as, slot games and video poker.

Memory 304 may be used to store accounting information (such as cashable electronic promotion in, non-cashable electronic promotion out, coin in, coin out, bill in, voucher in, voucher out, electronic funds transfer in, etc.).

Memory 304 may be used to record error conditions on an electronic gaming device 100 such as, door open, coin jam, ticket print failure, ticket (paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (i.e., a wagering instrument with a fixed waging value that can only be used for non-cashable credits), drink tokens, comps, or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Video obtained by camera 312 may be used as part of game play or may be used for security purposes. For example, a camera located on electronic gaming device 100 may capture video of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g. sporting event 1, sporting event 2, sporting event 3), to request services (e.g., drinks, manager, etc.), or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g. smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used for other locations inside of the gaming establishment. For example, the voucher may be a coupon for the local buffet or a concert ticket.

Figure 4:
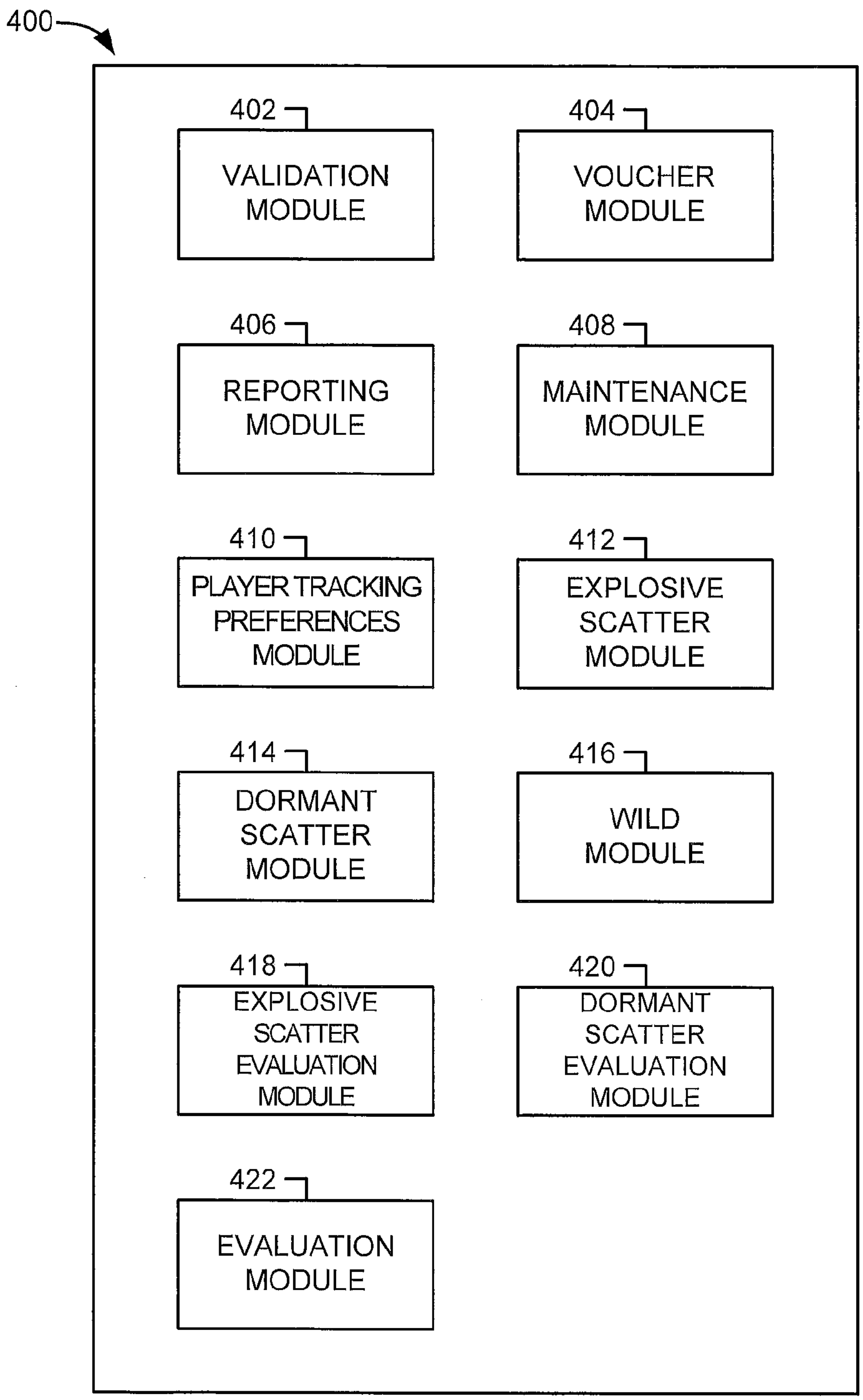
FIG. 4 is a block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an explosive scatter module 412, a dormant scatter module 414, a wild module 416, an explosive scatter evaluation module 418, a dormant scatter evaluation module 420, and an evaluation module 422.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Explosive scatter module 412 may store various explosive scatter structures related to game results. For example, explosive scatter structures may include one-to-five explosive scatters in a row; one-to-five explosive scatters in a column; one explosive scatter in a first row, one explosive scatter in a third row, and one explosive scatter in a five row; one explosive scatter in a first column, one explosive scatter in a second column, one explosive scatter in a fourth column, and one explosive scatter in a fifth column; one explosive scatter in a first row, one scatter in the first row, one explosive scatter in a third row, and one scatter in a fifth row; or any combination that utilizes one or more spaces on one or more reels utilized by electronic gaming device 100 and/or electronic gaming system 200.

In another example, processor 302 via explosive scatter module 412 (and/or explosive scatter evaluation module 418) may determine that an explosive scatter has interacted with: a first symbol to generate a first payout (e.g., 50 credits); one or more symbols to generate a second payout (e.g., 500 credits); a first dormant scatter to generate a third payout (e.g., 100 credits); a second dormant scatter to generate a fourth payout (e.g., 1,000 credits); a wild to generate a fifth payout (e.g., 150 credits); one or more other explosive scatter(s) to generate a sixth payout (e.g., 10,000 credits); two or more dormant scatters interrelated (e.g., next to each other, connected, within a specific area; within a specific area to each other, etc.) to each other; two or more wilds interrelated (e.g., next to each other, connected, within a specific area; within a specific area to each other, etc.) to each other; and/or any other interaction with any other symbol.

Dormant scatter module 414 may store various dormant scatter structures related to game results. For example, dormant scatter structures may include one-to-five dormant scatters in a row; one-to-five dormant scatters in a column; one dormant scatter in a second row, one explosive scatter in a fourth row, and one scatter in a five row; one dormant scatter in a first column, one explosive scatter in a third column, one scatter in a fourth column, and one dormant scatter in a fifth column; or any combination that utilizes one or more spaces on one or more reels utilized by electronic gaming device 100 and/or electronic gaming system 200.

In another example, processor 302 via dormant scatter module 414 (and/or dormant scatter evaluation module 420) may determine that a dormant scatter has interacted with: a first explosive scatter to generate a first payout (e.g., 100 credits); a second explosive scatter to generate a second payout (e.g., 1,000 credits); a wild to generate a third payout (e.g., 150 credits); one or more other dormant scatter(s) to generate a fourth payout (e.g., 10,000 credits); two or more explosive scatters interrelated (e.g., next to each other, connected, within a specific area; within a specific area to each other, etc.) to each other; two or more wilds interrelated (e.g., next to each other, connected, within a specific area; within a specific area to each other, etc.) to each other; one or more explosive scatters, and/or any other interaction with any other symbol.

Wild module 416 may determine payouts related to game results when there are one or more wild symbols utilized in the game results. For example, processor 302 via wild module 416 may determine that a wild has interacted with: a first explosive scatter to generate a first payout (e.g., 100 credits); a second explosive scatter to generate a second payout (e.g., 1,000 credits); a first scatter to generate a third payout (e.g., 150 credits); one or more other wilds to generate a fourth payout (e.g., 10,000 credits); one or more dormant scatters interrelated (e.g., next to each other, connected, within a specific area; within a specific area to each other, etc.) to each other; two or more explosive scatters interrelated (e.g., next to each other, connected, within a specific area; within a specific area to each other, etc.) to each other; and/or any other interaction with any other symbol.

Explosive scatter evaluation module 418 may determine payouts related to game results when there are explosive scatter utilized in the game results. For example, processor 302 via explosive scatter evaluation module 418 may determine that an explosive scatter has interacted with: a first dormant scatter (and/or a first scatter) to generate a first payout (e.g., 25 credits); a second explosive scatter (and/or a second scatter) to generate a second payout (e.g., 155 credits); a wild to generate a third payout (e.g., 350 credits); one or more other explosive scatter(s) to generate a fourth payout (e.g., 1,000 credits); two or more dormant scatters (and/or two or more scatters and/or two or more explosive scatters) interrelated (e.g., next to each other, connected, within a specific area; within a specific area to each other, etc.) to each other; two or more wilds interrelated (e.g., next to each other, connected, within a specific area; within a specific area to each other, etc.) to each other; and/or any other interaction with any other symbol.

Dormant scatter evaluation module 420 may determine payouts related to game results when there are dormant scatter utilized in the game results. For example, processor 302 via dormant scatter evaluation module 420 may determine that a dormant scatter has interacted with: a first explosive scatter (and/or a first scatter) to generate a first payout (e.g., 100 credits); a second explosive scatter (and/or a second scatter) to generate a second payout (e.g., 1,000 credits); a wild to generate a third payout (e.g., 150 credits); one or more other dormant scatter(s) to generate a fourth payout (e.g., 10,000 credits); two or more explosive scatters (and/or two or more scatters and/or two or more explosive scatters) interrelated (e.g., next to each other, connected, within a specific area; within a specific area to each other, etc.) to each other; two or more wilds interrelated (e.g., next to each other, connected, within a specific area; within a specific area to each other, etc.) to each other; and/or any other interaction with any other symbol.

Evaluation module 422 may determine payouts related to game results when there are no modifications made by one or more explosive scatters, contagious scatters, contagious explosive scatters, dormant contagious scatters, and/or scatters.

It should be noted that explosive scatter module 412, dormant scatter module 414, wild module 416, explosive scatter evaluation module 418, dormant scatter evaluation module 420, and evaluation module 412 may be combined into one module. Further, there may be one evaluation module where the determined payout does not depend on whether there were any explosive scatters, contagious scatters, contagious explosive scatters, dormant contagious scatters, and/or scatters.

A payout module may include various payouts, which may include explosive scatter payouts, non-scatter payouts, dormant scatter payouts, wild payouts, bonus payouts, and/or any other type of payout.

In another embodiment, the device and/or system may determine the effects of the explosive scatters on the surrounding symbols, including other explosive scatters, contagious scatters, contagious explosive scatters, dormant contagious scatters, and/or scatters, wilds, dormant wilds, and blocking symbols (e.g., how many degrees of separation the explosive scatter is able to affect, modifying dormant wilds into wilds, modifying dormant scatters to scatters (and/or explosive scatters), modifying scatters to explosive scatters, etc.). In addition, any other symbol (e.g., blocker symbols) may affect the characteristic of explosive scatters, contagious scatters, contagious explosive scatters, dormant contagious scatters, scatters, wilds, dormant wilds, dormant explosive scatters, etc. For example, blockers may convert an explosive scatter into a scatter. Further, blockers may modify a dormant explosive scatter (and/or a scatter and/or an explosive scatter) to a blank symbol. Blockers may modify a wild (and/or a dormant wild) into a blank.

Scatter symbols are symbols that may generate a payout by appearing anywhere on the reels. If a specific number of scatter symbols appears on the plurality of reels, a payout may be generated even when the scatter symbols are not on a specific payline.

Figure 5A:
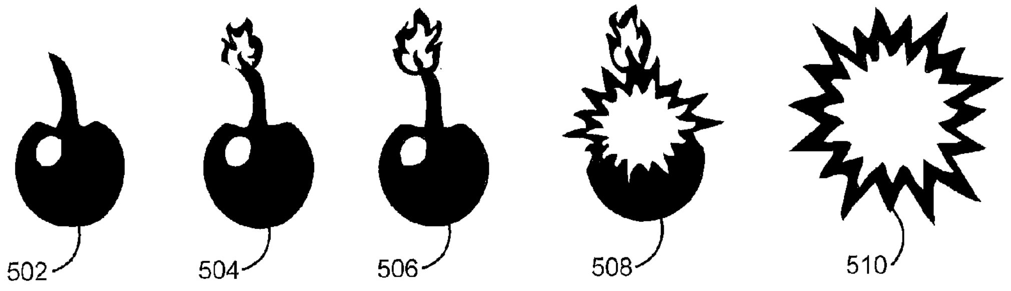
FIGS. 5A-5B are illustrations of images representing a symbol exploding, which can be utilized on an electronic gaming device, according to embodiments.
Figure 5B:
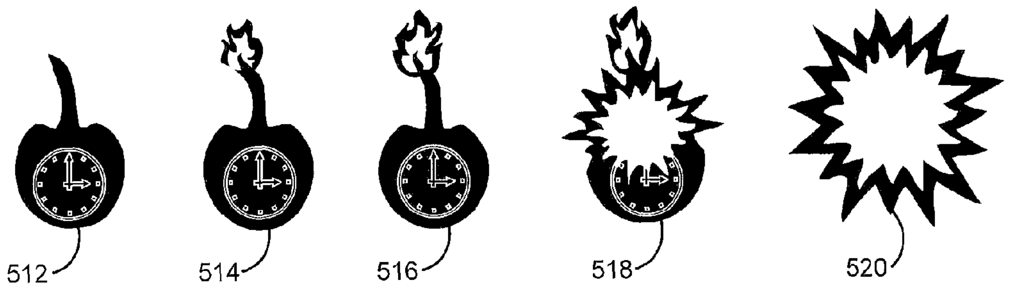

In FIGS. 5A-5B, illustrations of symbols (e.g., cherry bombs, etc.) exploding are shown, according to various embodiments. FIG. 5A shows a first image 502, a second image 504, a third image 506, a fourth image 508, and a fifth image 510. First image 502 shows the symbol in a non-ignited state. Second image 504 shows the symbol in an initial ignited state. Third image 506 shows the symbol in a further ignited state. Fourth image 508 shows the symbol in an initial explosive state. Fifth image 510 shows the symbol in an explosive state.

FIG. 5B shows a first clock image 512, a second clock image 514, a third clock image 516, a fourth clock image 518, and a fifth clock image 520. First clock image 512 shows the symbol in a non-ignited state with a clock. Second clock image 514 shows the symbol in an initial ignited state with a clock. Third clock image 516 shows the symbol in a further ignited state with a clock. Fourth clock image 518 shows the symbol in an initial explosive state with a clock. Fifth clock image 520 shows the symbol in an explosive state. Clock may have clock arms that move (e.g., from 10 seconds down to zero, from 1 minute down to zero, from 1 hour down to zero, etc.) to show that symbol is moving to an explosive state.

Figure 5C:
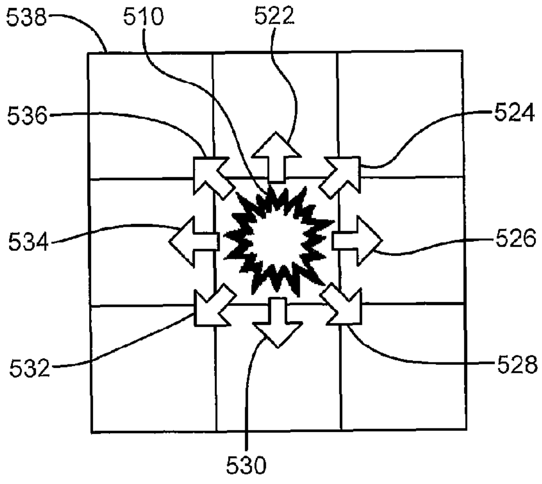
FIG. 5C is an illustration of the various directions that the explosion may travel when the exploding symbol explodes, according to embodiments.

In FIG. 5C, an illustration showing various directions that the explosion may travel from an exploding symbol are shown, according to exemplary embodiments. A grid 538 shows an exploding symbol 510, according to an embodiment. An explosion from exploding symbol 510 may travel in a first direction 522, a second direction 524, a third direction 526, a fourth direction 528, a fifth direction 530, a sixth direction 532, a seventh direction 534, an eighth direction 536, and/or any other directions. First direction 522 may be one or more spaces up. Second direction 524 may be one or more spaces diagonally up and one or more spaces to the right. Third direction 526 may be one or more spaces to the right. Fourth direction 528 may be one or more spaces diagonally down and one or more spaces to the right. Fifth direction 530 may be one or more spaces down. Sixth direction 532 may be one or more space diagonally down and one or more spaces to the left. Seventh direction 534 may be one or more spaces to the left. Eight direction 536 may be one or more spaces diagonally up and one or more spaces to the left. Another direction may be two spaces to the left and then one space up. In addition, a direction may be two spaces down, three spaces to the right, and then one space up.

In an exemplary embodiment, after the reels stop spinning and an award is determined, one or more scatter symbols may explode and destroy symbols in a predetermined area and turn the destroyed (e.g., contacted) symbols into an award (e.g., credits, free spins, multipliers, etc.). In another example, symbols may form a chain reaction (e.g., contagious explosive scatters, contagious scatters, contagious dormant scatters, scatters, etc.) and generate an increased award. This chain reaction may include two or more symbols on one or more reels.

In another example, a free-spin scatter bonus may include three or more free-spin scatter symbols which may appear anywhere on reels 2, 3, and 4. These symbols may unlock free-spin awards. In this example, additional free-spin scatters, explosive scatters, contagious scatters, contagious explosive scatters, dormant contagious scatters, and/or scatters may be generated on one or more reels, which may increase the awards (e.g., credits, free spins, multipliers, etc.) in a bonus round.

In another example, after the award for the scatters are generated, the scatters may begin to sizzle, the scatters may then explode, which may generate additional awards for the symbols that the explosions react with. In another example, the awards may be placed into a central bucket.

In an embodiment, the value (e.g., credits, free spins, multipliers, etc.) of a symbol (e.g., dormant scatter) may vary based on the image utilized for this symbol. For example, an Ace that explodes may be worth more than a Jack that explodes.

In another embodiment, the value (e.g., credits, free spins, multipliers, etc.) of a symbol (e.g., dormant scatter) may vary based on the distance (e.g., position) relative to the initiating explosive scatter (e.g., original scatter, starting scatter, etc.).

In another embodiment, the value (e.g., credits, free spins, multipliers, etc.) of a symbol (e.g., dormant scatter) may vary by the number of exploding symbols. This may increase the multiplier up for each subsequent event or for all scatters. For example, a first explosion may be at 1× the reward amount, the second explosion may be at 2× the reward amount, the third explosion may be at 3× the reward amount, etc. In another example, the second explosion (up to the $N^{th}$ N explosion) may increase the award for all explosions (e.g., past explosions, current explosions, future explosions, and/or any combination thereof). In another example, the exploding symbols may have a random multiplier. In another example, the dormant scatter's value may be based on the number of symbols impacted. For example, there was would be different value for impacting three symbols compared to four symbols.

In another embodiment, additional bonus payouts may be awarded for particular patterns of unexploded versus exploded symbols on the reel matrix. For example, when all four corners are exploded (or unexploded) an additional bonus payout may occur. In another example, when all symbols in a row are exploded (or unexploded) an additional bonus payout may occur. In another example, when all symbols of a certain multiple reels are exploded (or unexploded) an additional payout may occur. In another example, when all of the symbols on the reels are exploded (or unexploded) an additional bonus payout may occur. These additional bonus payouts may be credits or a trigger for another bonus. This additional bonus may be free spins or a progress jackpot. These patterns may be re-evaluated every game (e.g. spin) or complied over multiple games (e.g., spins).

In another embodiment, exploding scatters may always explode. In another example, exploding scatters may explode when an additional wager is made (e.g., ante bet). In another example, exploding scatters may explode no matter how many exploding scatters are present on the reels. In addition, exploding scatters may explode independent of their position on the reels. In another example, exploding scatters may explode when a minimum number of exploding scatters are located on the reels. In another example, exploding scatters may explode when multiple exploding scatters appear on consecutive reels starting on the leftmost reel.

Figure 6A:
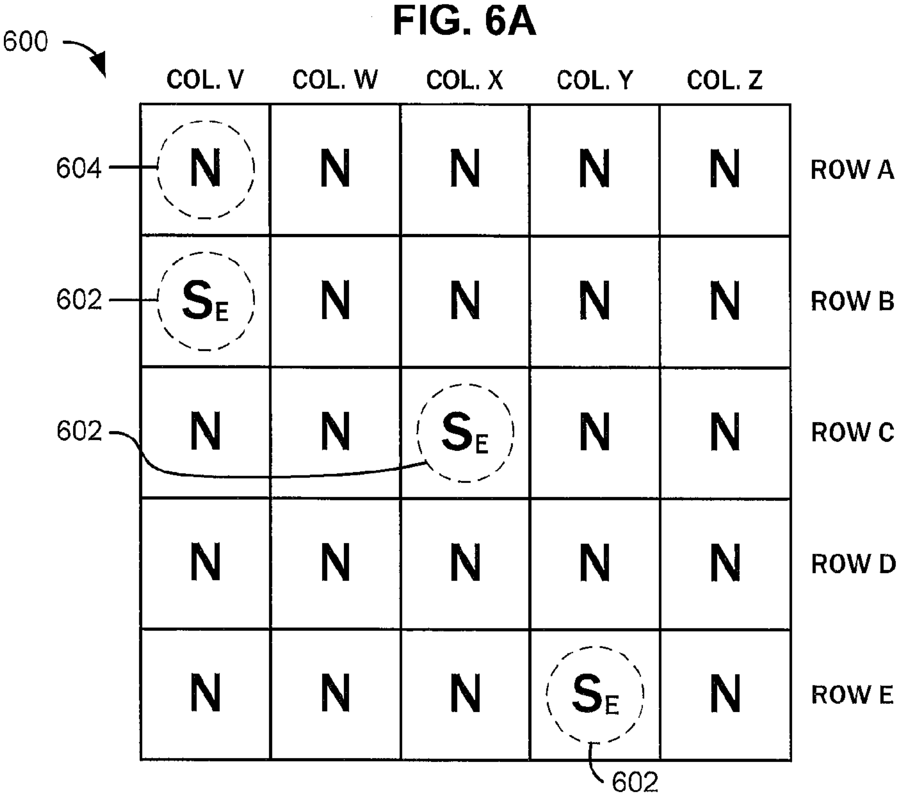
FIGS. 6A-6F are various illustrations of exploding symbols interacting with other symbols including other exploding symbols, according to various embodiments.

FIG. 6A shows a screen image 600 of paylines and reels for an electronic gaming device, according to one embodiment. Screen image 600 may include a predetermined number of rows (e.g., Rows A-E) and a predetermined number of columns (e.g., Columns V-Z). Screen image 600 may include any number of rows and any number of columns. For example, screen image 600 may have five rows and ten columns; screen image 600 may have eight rows and thirteen columns, or any other combinations of rows and columns. A wagering event may be initiated by the player through input device 316. Images in each cell (e.g., (Row A, Column V), (Row C, Column W), (Row D, Column Y), etc.) may be any symbol (e.g., explosive scatters, contagious scatters, contagious explosive scatters, dormant contagious scatters, scatters, wilds, blockers, etc.).

In a game, positioning of the images on the reels may be displayed to show the outcome of a wagering event (e.g., a win or a loss for the player) on screen image 500. For example, the same image (e.g., cherries, bars, wilds, pictures of the player as captured by camera 312, etc.) in a predetermined pattern may create a winning event.

In FIG. 6A, a non-exploded explosive scatter 602 may be positioned below a symbol 604. In an exemplary embodiment, one or more non-exploded explosive scatters 602 may be located on various areas within the plurality of reels. Symbol 604 may be a scatter, a dormant scatter, a dormant explosive scatter, a wild, a blank, and/or any other symbol.

Figure 6B:
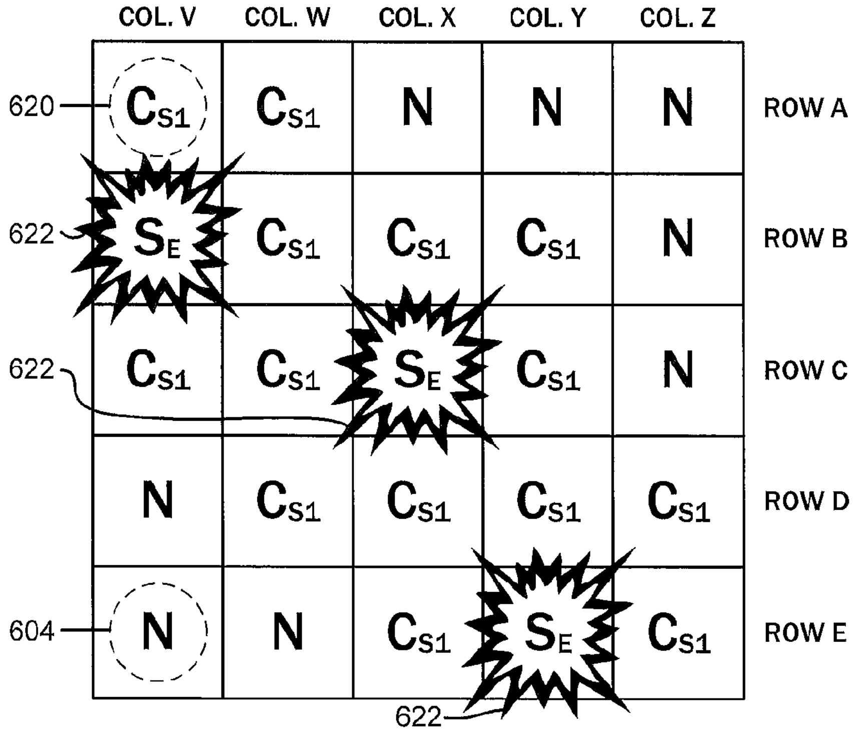

In FIG. 6B, the one or more explosive scatters 622 may be positioned relative to (or in contact with) symbols, which may interact with one or more explosive scatters 622. For example, explosive scatter 622 in cell (Row B/Col. V) has exploded onto five different cells (e.g., Row A/Col. V, Row A/Col. W, Row B/Col. V, Row C/Col. V, and Row C/Col. W). In this example, explosive scatter 622 may be limited because there are no cells to the left of explosive scatter 622. Therefore, this explosive scatter 622 may only enter into five cells. This explosion may, in one or more of the five different cells reveal credits, multipliers, free spins, any other reward, and/or any combination thereof.

In another example, explosive scatter 622 in cell (Row C/Col. X) has expanded into eight different cells (e.g., Row B/Col. W, Row B/Col. X, Row B/Col. Y, Row C/Col. W, Row C/Col. Y, Row D/Col. W, Row D/Col. X, and Row D/Col. Y).

In this example, explosive scatter 622 may not be limited because there are cells all around explosive scatter 622. Therefore, this explosive scatter 622 may enter all eight cells around explosive scatter 622. This explosion may, in one or more of the eight different cells reveal credits, multipliers, free spins, any other reward, and/or any combination thereof.

Further, explosive scatter 622 in cell (Row E/Col. Y) may enter five different cells (e.g., Row D/Col. X, Row D/Col. Y, Row D/Col. Z, Row E/Col. X, and Row E/Col. Z). In this example, explosive scatter 622 may be limited because there are no cells below explosive scatter 622. Therefore, this explosive scatter 622 may only enter into five cells. This explosion may, in one or more of the five different cells reveal credits, multipliers, free spins, any other reward, and/or any combination thereof. These explosions may be animated.

In this example, explosive scatters 622 had a power level of one. The power level may represent the number of spaces that explosive scatter 622 may expand into, explode into, enter into, generate a path to, and/or reach. Further, if one or more explosive scatters 622 explodes into the same cell (e.g., Row B/Col. W, Row C/Col. W, Row D/Col. X, and Row D/Col. Y) the amount of rewards may be increased (e.g., multiplied, increased by a flat amount, combined with another reward, and/or any combination thereof). For example, the reward in any one of these cells may have been 100 credits, which is converted into 200 credits because there was a 2× multiplier based on the two explosive scatters entering the same cell. In another example, the award may have been increased by 200 credits to 300 credits based on the two explosive scatters entering the same cell. In yet another example, the award may have included a 2× multiplier, 200 extra credits, and 5 free spins based on the two explosive scatters entering the same cell.

Figure 6C:
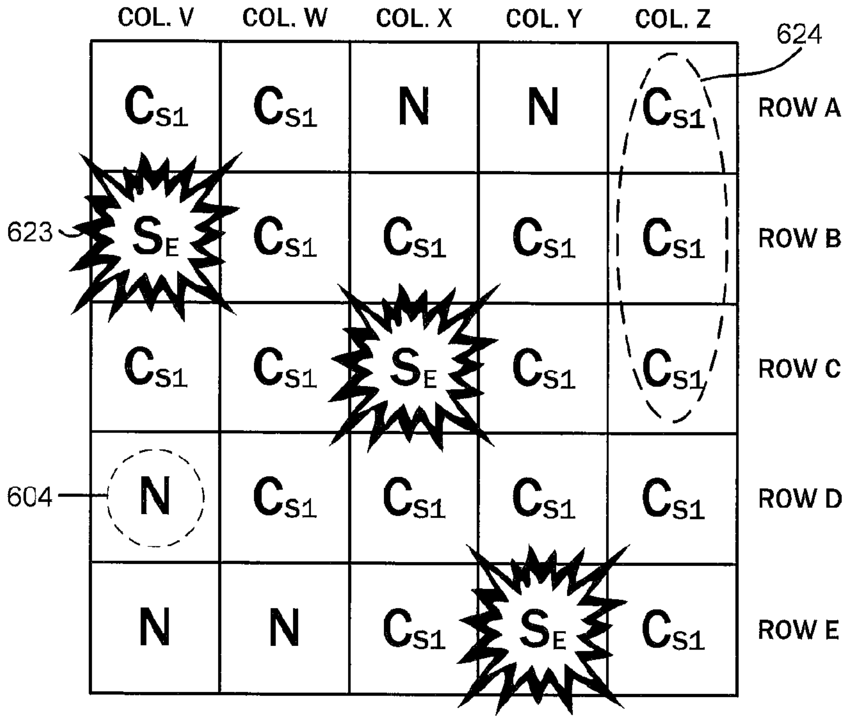

FIG. 6C demonstrates a wrap-around effect, according to an embodiment. A wrap-around explosive scatter 623 may be able to reach around to the other size of the display/plurality of reels. In this example, wrap-around explosive scatter 623 may explode onto/enter into a wrap-around cell 624. Wrap-around explosive scatter 623 may generate rewards (e.g., credits, multipliers, free spins, etc.) in wrap-around cell 624 because wrap-around cell 624 may be considered to be directly adjacent to Col. V. In various examples, the wrap-around effect may be from bottom-to-top, top-to-bottom, left-to-right, right-to-left, and/or any combination thereof.

In FIGS. 6B-6C, explosive scatters 622 and wrap-around explosive scatters 623 had a power level of one in all directions. Explosive scatters 622 may have entered any cell in any directions that was located adjacent (e.g., one spatial unit in any direction) to explosive scatters 622. Wrap-around explosive scatters 623 may have entered any cell in any directions that was located adjacent (e.g., one spatial unit in any direction) and/or virtual adjacent (e.g., one spatial unit in any direction including moving a row and/or column) to wrap-around explosive scatters 623. In exemplary embodiments, any form of explosive scatter may have different power levels (e.g., power level one—one spatial unit, power level two—two spatial units, power level three—three spatial units, power level one in first direction 532 with a power level of five in third direction 526, etc.). Further, any form of explosive scatter may be limited to one or more directions. For example, any form of explosive scatter may be limited to one or more of first direction 522, second direction 524, third direction 526, fourth direction 528, fifth direction 530, sixth direction 532, seventh direction 534, and eight direction 536, which were described in relation to FIG. 5C. In addition, the direction may be two spaces to the left and then one space up. Further, a direction may be two spaces down, three spaces to the right, and then one space up. Lastly, a direction or power level may be any path that may be created on the plurality of reels.

Figure 6D:
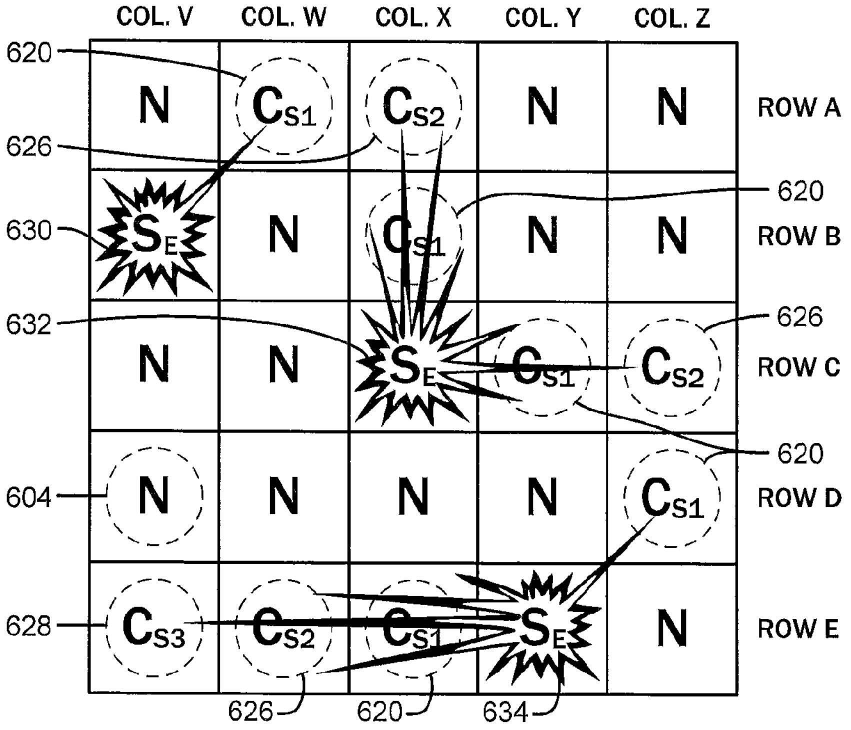

In FIG. 6D, a first explosive scatter 630, a second explosive scatter 632, and a third explosive scatter 634 are shown, according to one embodiment. First explosive scatter 630 may have a power level of one which may only reach to the cell represented by Row A/Col. W. First explosive scatter 630 would be able to expand one spatial unit in one direction, which would be located one unit to the right and up one unit. This expansion (e.g., explosion) may reveal credits, multipliers, free spins, any other reward, and/or any combination thereof.

Second explosive scatter 632 may have a power level of two which may only reach in two directions (e.g., up and right). Second explosive scatter 632 would be able to expand two spatial units in two directions. First, second explosive scatter 632 may expand two spatial units up to cell (Row A/Col. X). This expansion may or may not also include cell (Row B/Col. X). Second, second explosive scatter 632 may expand two spatial units to cell (Row C/Col. Z). This expansion may or may not also include cell (Row C/Col. Z). These expansions (e.g., explosions) may reveal credits, multipliers, free spins, any other reward, and/or any combination thereof.

Third explosive scatter 634 may have a varying power level of one and/or three which may only reach in two directions (e.g., left and right diagonally up). Third explosive scatter 634 would be able to expand three spatial units in one direction (e.g., left) and one spatial unit in one direction (e.g., diagonally up and to the right). First, third explosive scatter 634 may expand three spatial units up to cell (Row E/Col. V). This expansion may or may not also include cells (Row E/Col. W and/or Row E/Col. X). Second, third explosive scatter 634 may expand one spatial unit to cell (Row D/Col. Z). This expansion may or may not also include cell (Row C/Col. Z). These expansions (e.g., explosions) may reveal credits, multipliers, free spins, any other reward, and/or any combination thereof.

In other embodiments, an explosive symbol may have varying power levels which create a path. For example, from an initial starting point the power level may be two in the down direction (e.g., two spatial units down). From that point two spatial units down, the power level may be three spatial units to the right. From that point three spatial units to the right, the power level may be two spatial units up. From that point two spatial units up, the power level may be three spatial units to the left, which would be a return to the initial starting point. Any path may be created by combining various power levels and directions.

Figure 6E:
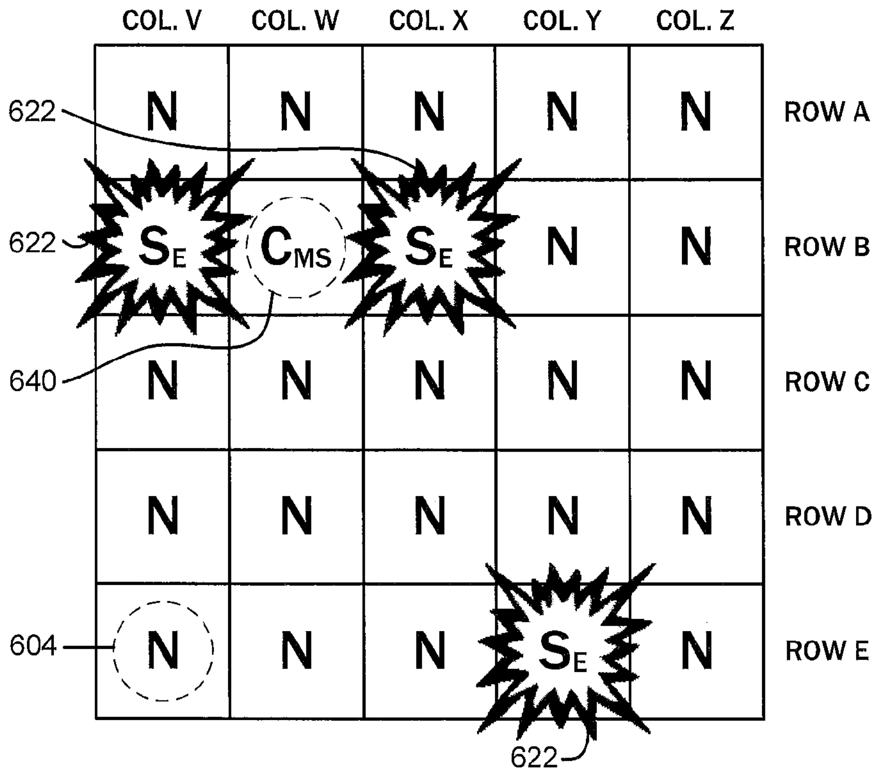

FIG. 6E shows a modifying symbol 640. Modifying symbol 640 may change one or more characteristics of another symbol based on a relative position of modifying symbol 640 to the other symbol. Further, modifying symbol 640 may change one or more characteristics of the other symbols when the other symbols and modifying symbol 640 are on the same payline.

For example, one or more characteristics of explosive scatter 622 in cell (Row B/Col. V) may be changed by modifying symbol 640 because this explosive scatter 622 is located adjacent to modifying symbol 640. In one example, this explosive scatter 622 had a power level of one, which is changed into a power level of five by modifying symbol 640. In another example, this explosive scatter 622 is changed into one of a scatter, a contagious explosive scatter, a contagious scatter, a scatter, a dormant scatter, a dormant explosive scatter, a dormant contagious scatter, a dormant explosive scatter, a wild, a blocker, or any other symbol by modifying symbol 640. In another example, this explosive scatter 622 had a power level of three, which is changed into a power level of one by modifying symbol 640.

Modifying symbol 640 may change the directional characteristics of explosive scatter 622. For example, explosive scatter 622 may have expanded one spatial unit in any direction. However, modifying symbol 640 may eliminated one or more of the directions that explosive scatter 622 may expand. In another example, if modifying symbol 640 is located in an interactive position with two or more explosive scatters (e.g., explosive scatter in (Row B/Col. V) and explosive scatter in (Row B/Col. X)), then modifying symbol 640 may have no effect on one or more of the explosive scatters. Alternatively, modifying symbol 640 may have an increased effect on one or more of the explosive scatters. Further, modifying symbol 640 may have a decreased effect on one or more of the explosive scatters.

Figure 6F:
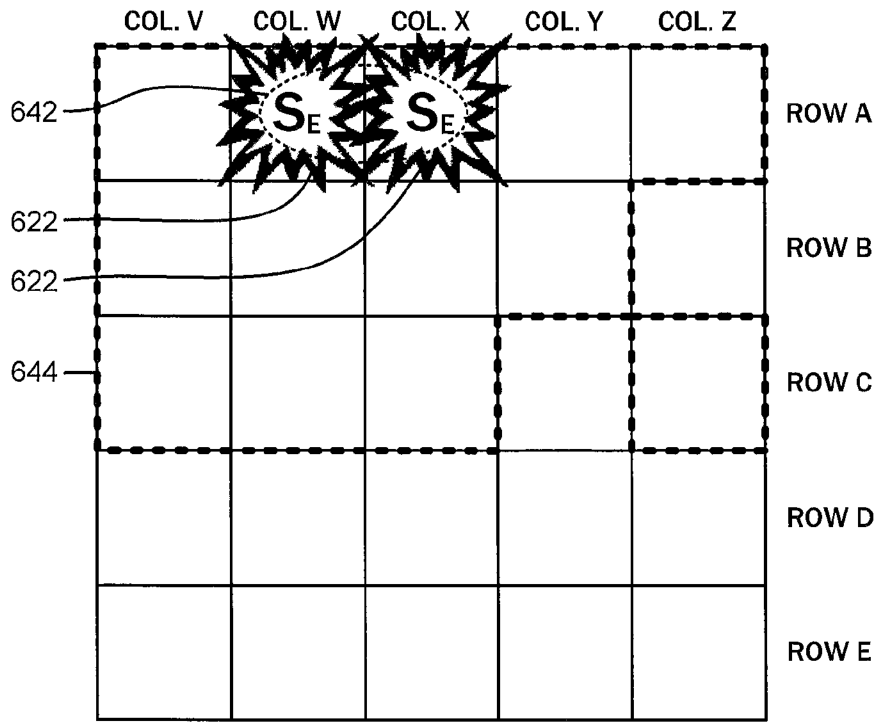

FIG. 6F shows two explosive scatter located adjacent to each other, according to one embodiment. Two or more explosive scatters in an interactive position (e.g., adjacent to, on the same payline, within a predetermined area, on the same row, in the same column, etc.) may generate a super explosive scatter 642. For example, the two explosive scatters may each have had a power level of one. Super explosive scatter 642 has a power level of two and expands into a first area 644. In another example, super explosive scatter 642 may have a power level of two and be a wrap-around scatter. Further, super explosive scatter 642 may have increased the reward generated in the cells that super explosive scatter 642 expanded into relative to what would have been generated by either of the two explosive scatters. Super explosive scatter 642 may have any power level and any directional characteristics.

In another example, the first explosive scatter may have a power level of one and the second explosive scatter may have a power level of three. When the first explosive scatter is combined with the second explosive scatter, super scatter 640 may have a power level of five. In addition, super scatter 640 may be able to reach every cell on the plurality of reels.

Figure 7A:
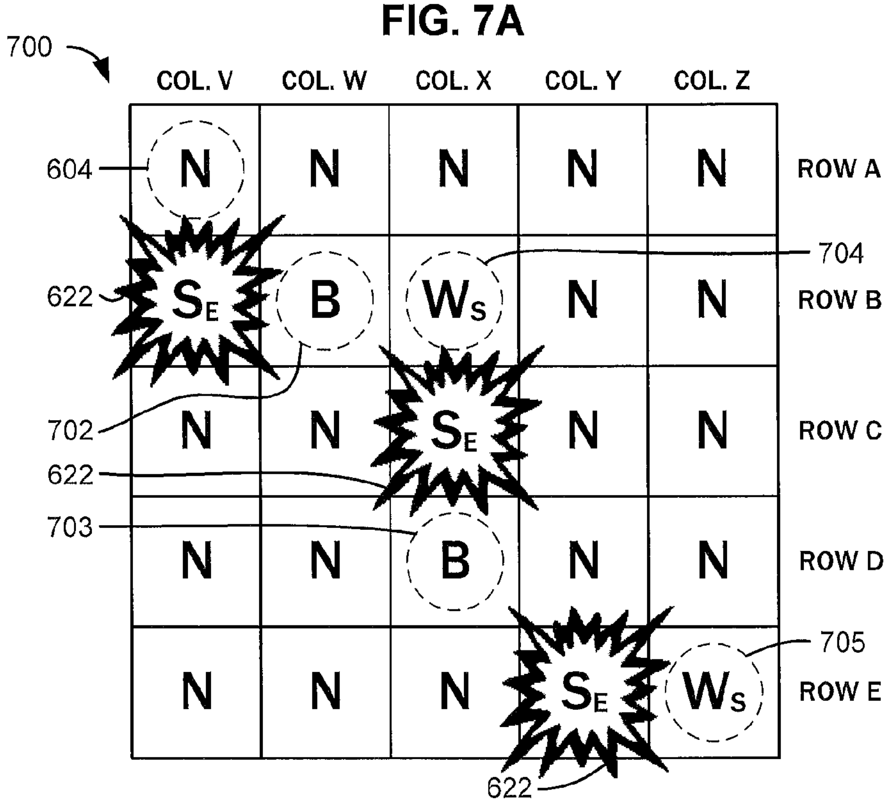
FIGS. 7A-7B are various illustrations of exploding symbols interacting with other symbols, according to various embodiments.

In FIG. 7A, a plurality of reels with a display image 700 is shown, according to one embodiment. Display image 700 may include a first blocker symbol 702, a second blocker symbol 703, a first wild symbol 704, a second wild symbol 705, blank symbol 604, and explosive scatter 622.

Figure 7B:
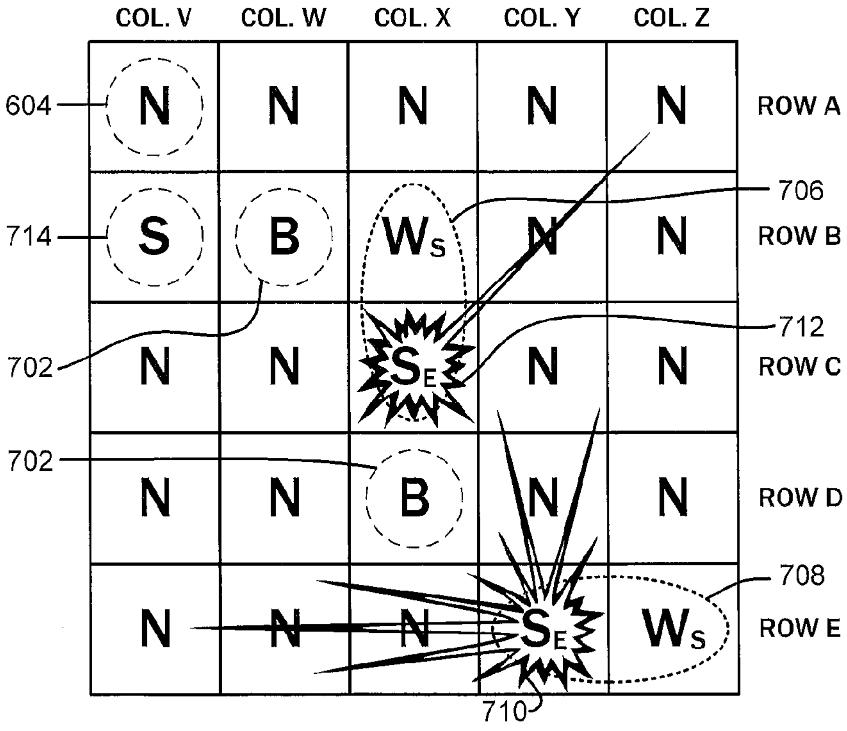

FIG. 7B shows that first blocker symbol 702, second blocker symbol 703, first wild symbol 704, and/or second wild symbol 705 may interact with explosive scatters 622. For example, first blocker symbol 702 may change explosive scatter 622 (e.g., cell, which is represented by Row B/Col. V) into a non-explosive scatter 714 (e.g., scatter) based on the interactive position of first blocker symbol 702 relative to this explosive scatter 622.

In another example, first wild symbol 704 may change explosive scatter 622 (e.g., cell which is represented by Row C/Col. X) into a first modified explosive scatter 706 which has a power level of two in a specific direction (e.g., diagonal up and to the right). In addition, this explosive scatter (first modified explosive scatter 706) may have been modified to have these characteristics because of an interaction with one or more of first blocker symbol 702, second blocker symbol 703, and/or first wild symbol 704. For example, if first blocker symbol 702 and/or second blocker symbol 703 was not adjacent to this explosive scatter, first wild symbol 704 may have changed the power level of first modified explosive scatter 706 to a power level of two, which may have expanded into two or more directions.

In another example, second wild symbol 705 may interact with explosive scatter 622 (e.g., cell, which is represented by Row E/Col. Y) to form a second modified explosive scatter 708. Second wild symbol 705 may have increased second modified explosive scatter 708 power level from a power level of two to a power level of three in all directions. However, second blocker symbol 703 may have also modified the characteristics of second modified explosive scatter 708 and limited which directions second modified explosive scatter may expand into and the power level in these directions. For example, second modified explosive scatter 708 may only expand two spatial units up and only three spatial units to the left.

Figure 8A:
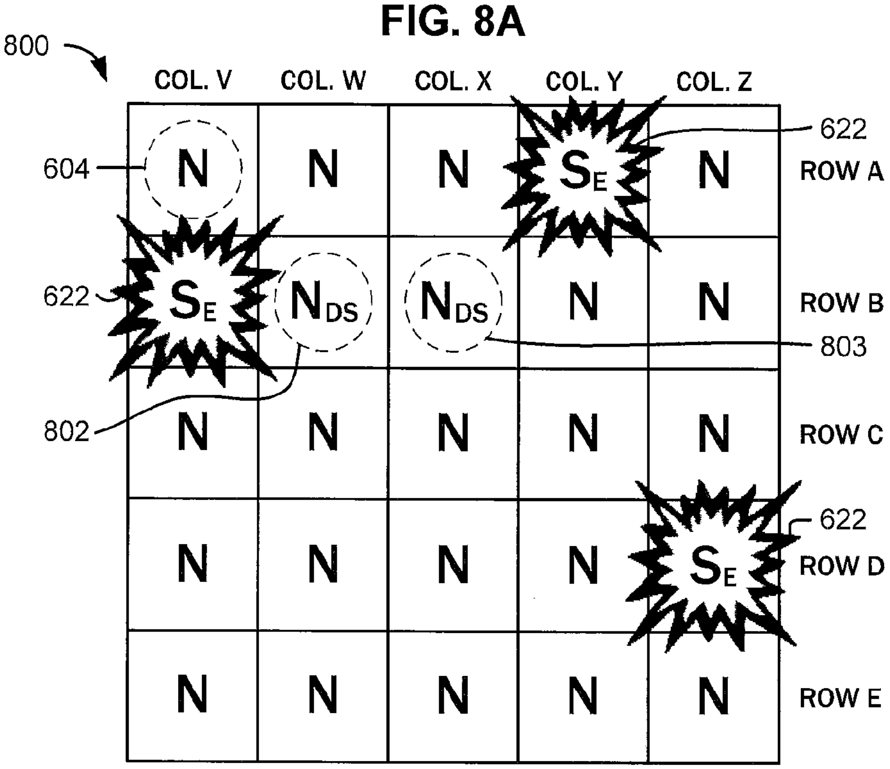
FIGS. 8A-8B are various illustrations of exploding symbols interacting with other symbols, according to various embodiments.
Figure 8B:
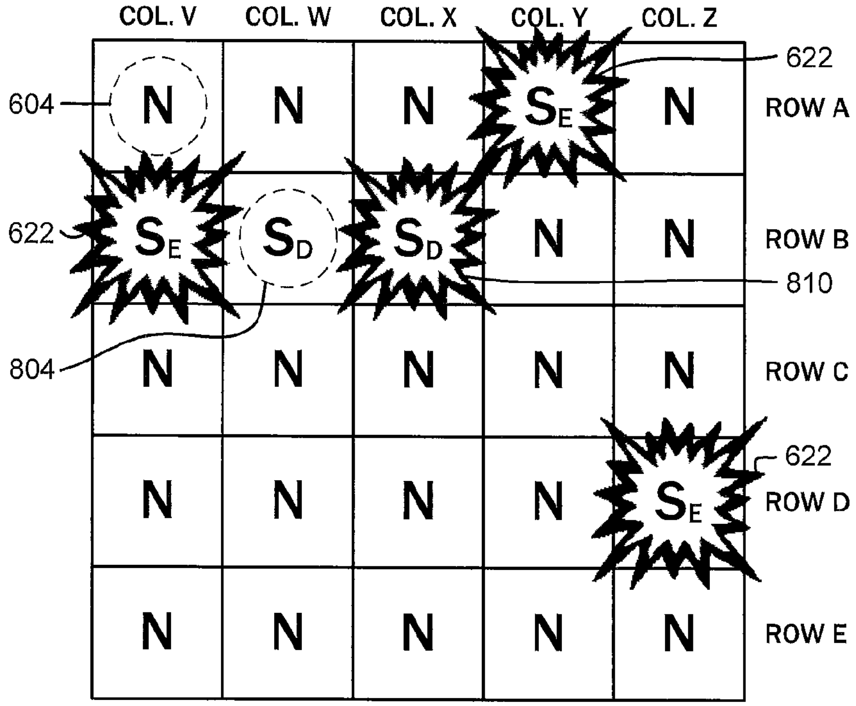

In FIGS. 8A-8B, illustrations demonstrating explosive scatters interacting with other symbols are shown, according to various embodiments. In one embodiment, explosive scatter 622 may be positioned adjacent (e.g., next to) to a first dormant scatter 802 and a second dormant scatter 803.

In FIG. 8B, a potential interaction between explosive scatter 622, first dormant scatter 802, and second dormant scatter 803 is shown. In this example, first dormant scatter 802 may be modified into a first scatter 804 based on the relative position of first dormant scatter 802 to explosive scatter 622. In another example, second dormant scatter 803 may be modified into a first explosive scatter 810 based on the relative position of second dormant scatter 803 to first dormant scatter 802 and explosive scatter 622. In one example, since first dormant scatter 802 is modified into first scatter 804, first dormant scatter may modify the properties of second dormant scatter which may result in second dormant scatter 803 being modified into first explosive scatter 810. In another example, second dormant scatter 803 may be modified into first explosive scatter 810 based on a position of second dormant scatter 803 relative to explosive scatter 622 (e.g., Row B/Col. V), explosive scatter 622 (e.g., Row A/Col. Y), and/or first dormant scatter 802.

Figure 9A:
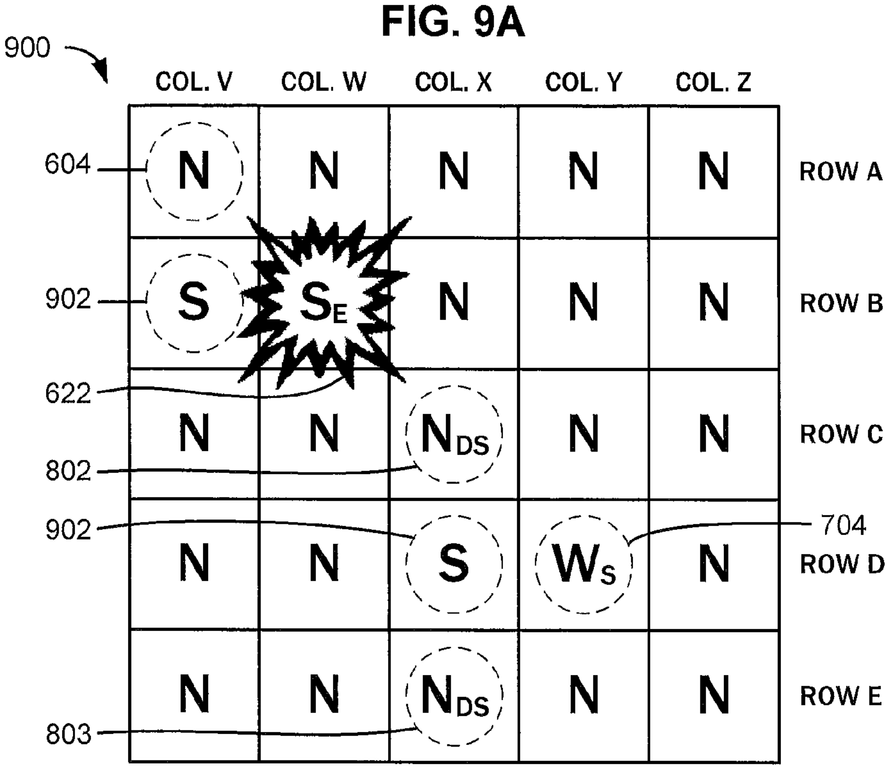
FIGS. 9A-9C are various illustrations of exploding symbols interacting with other symbols, according to various embodiments.
Figure 9B:
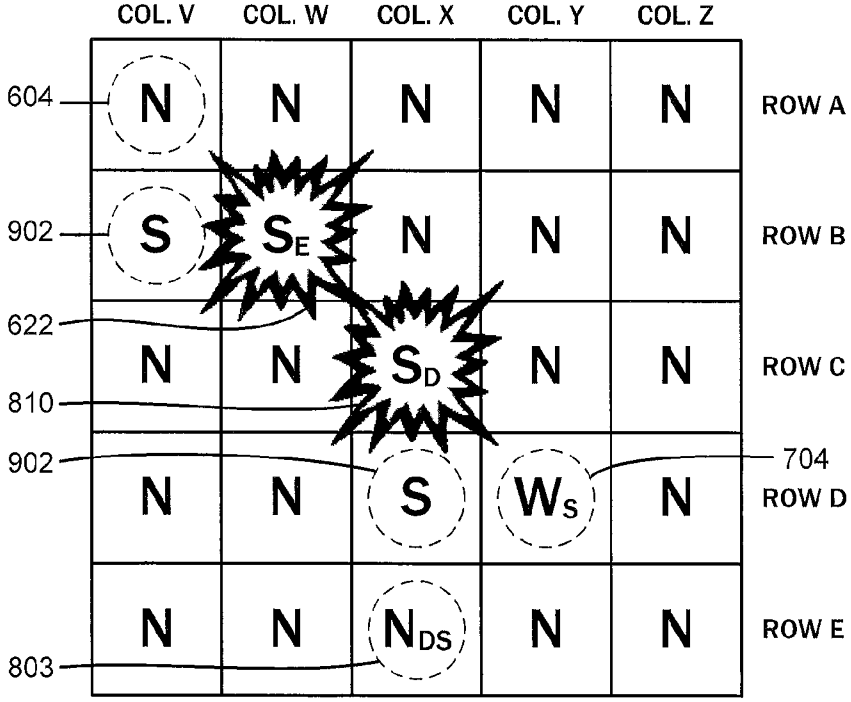
Figure 9C:
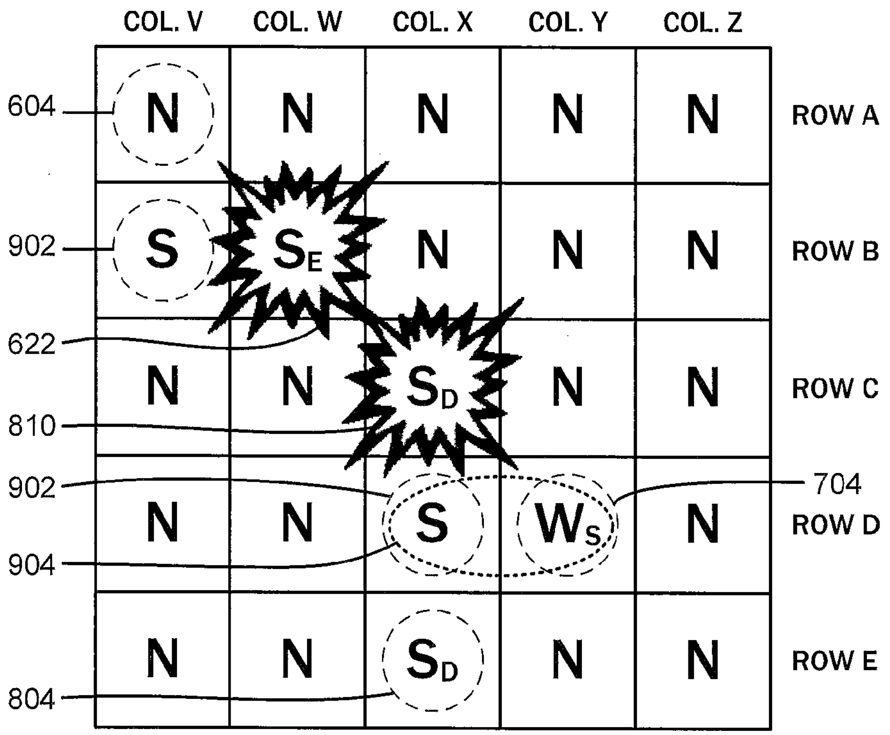

FIGS. 9A-9C show various illustrations of exploding symbols interacting with other symbols, according to various embodiments. In FIG. 9A, an illustration includes first dormant scatter 802, explosive scatter 622, a non-explosive scatter 902, wild symbol 704, and second dormant scatter 803.

In FIG. 9B, first dormant scatter 802 may be modified into first explosive scatter 810 based on a position of first dormant scatter 802 to a position of one or more of explosive scatter 622, non-explosive scatter 902, wild symbol 704, and second dormant scatter 803. For example, first dormant scatter 802 being in contact with explosive scatter 622 and non-explosive scatter 902 may modify first dormant scatter 802 into first explosive scatter 810. In another example, first dormant scatter 802 being in a predetermined area with non-explosive scatter 902 and wild symbol 704 may modify first dormant scatter 802 into first explosive scatter 810. In another example, first dormant scatter 802 being in contact with non-explosive scatter 902 when non-explosive scatter 902 is in contact with second dormant scatter 803 and/or wild symbol 704 may modify first dormant scatter 802 into first explosive scatter 810.

It should be noted that first explosive scatter 810 may be substituted for any other symbol. For example, first dormant scatter 802 being in a predetermined area with non-explosive scatter 902 and wild symbol 704 may modify first dormant scatter 802 into another non-explosive scatter, a wild symbol, and/or any other symbol.

In FIG. 9C, non-explosive scatter 902 being in contact (or a predetermined area relative to) with wild symbol 704 may modify both symbols to generate an expanded explosive scatter 904 (and/or any other symbols). For example, expanded explosive scatter 904 may be a symbol that utilizes the area represented by Row D, Col. X and Row D, Col. Y. Expanding explosive scatter 904 may explode into one or more spatial units in one or more directions.

Figure 10A:
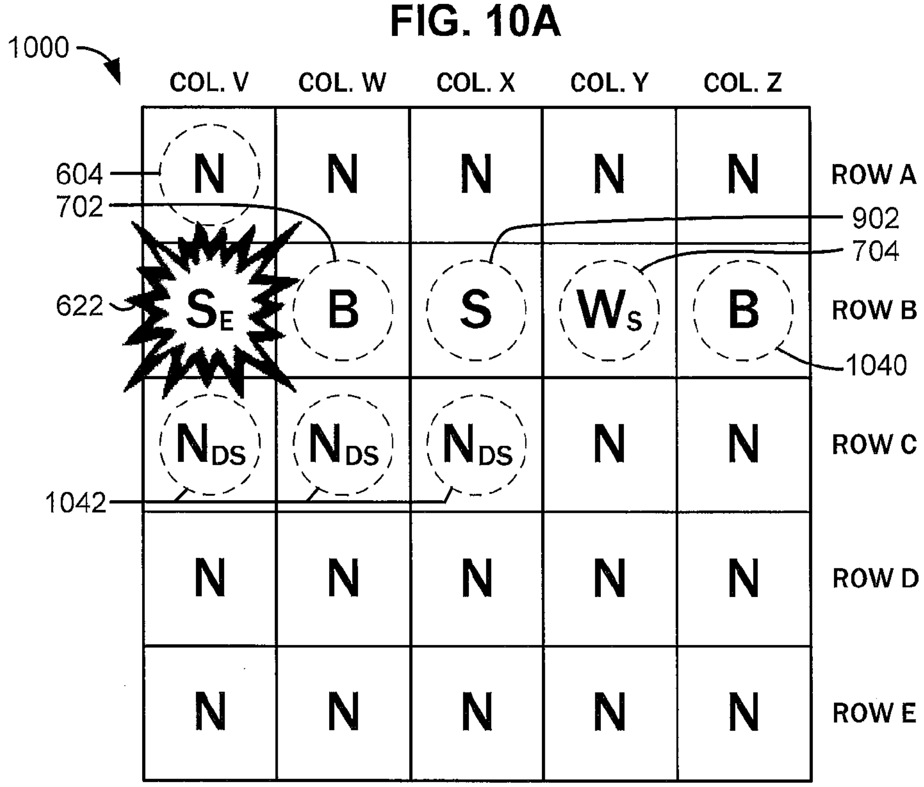
FIGS. 10A-10F are various illustrations of symbols interacting with other symbols, according to various embodiments.

FIGS. 10A-10F show various illustrations of symbols interacting with other symbols, according to various embodiments. In FIG. 10A, the image includes explosive scatter 622, blocker symbol 702, non-explosive scatter 902, wild symbol 704, a second blocker symbol 1040, and a dormant scatter group 1042.

Figure 10B:
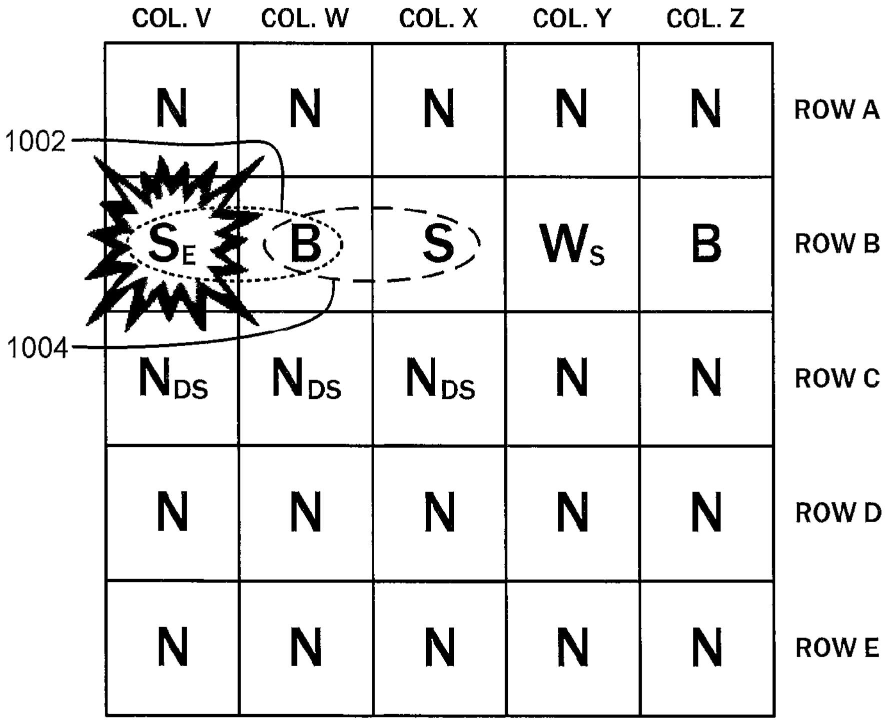

FIG. 10B shows a first blocker interaction 1002 and a second blocker interaction 1004. First blocker interaction 1002 may modify explosive scatter (e.g., cell represented by Row B/Col. V) to limit the expansion/explosion in one or more direction and/or one or more spatial units. In another example, first blocker interaction 1002 may modify explosive scatter into a non-explosive scatter, a non-wild symbol, and/or a wild symbol. Second blocker interaction 1004 may modify scatter (e.g., cell represented by Row B/Col. X) into a non-wild symbol and/or a wild symbol.

Figure 10C:
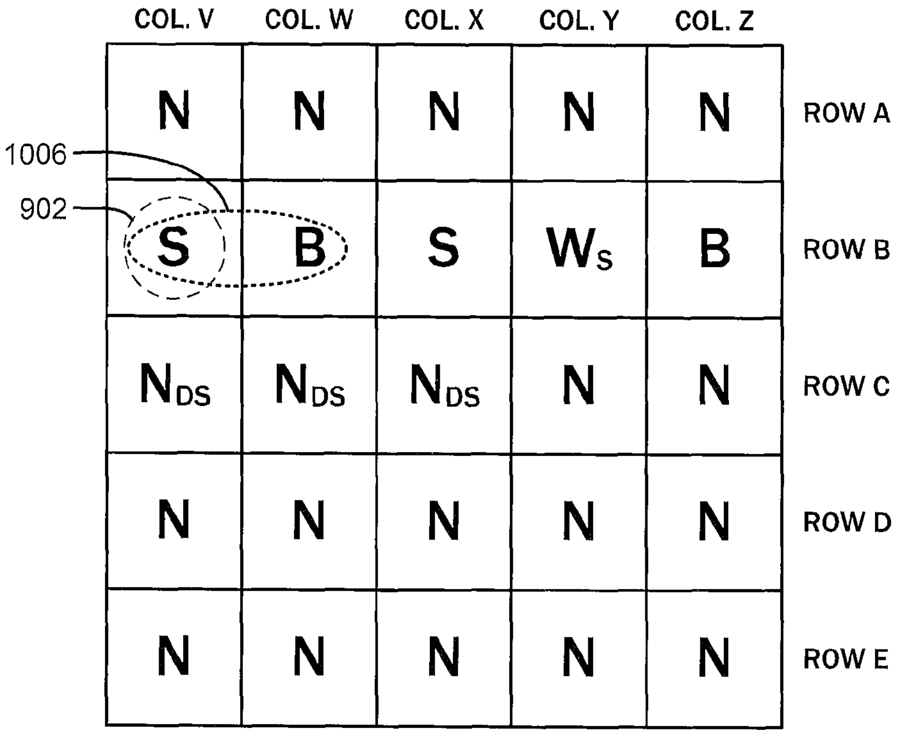
Figure 10D:
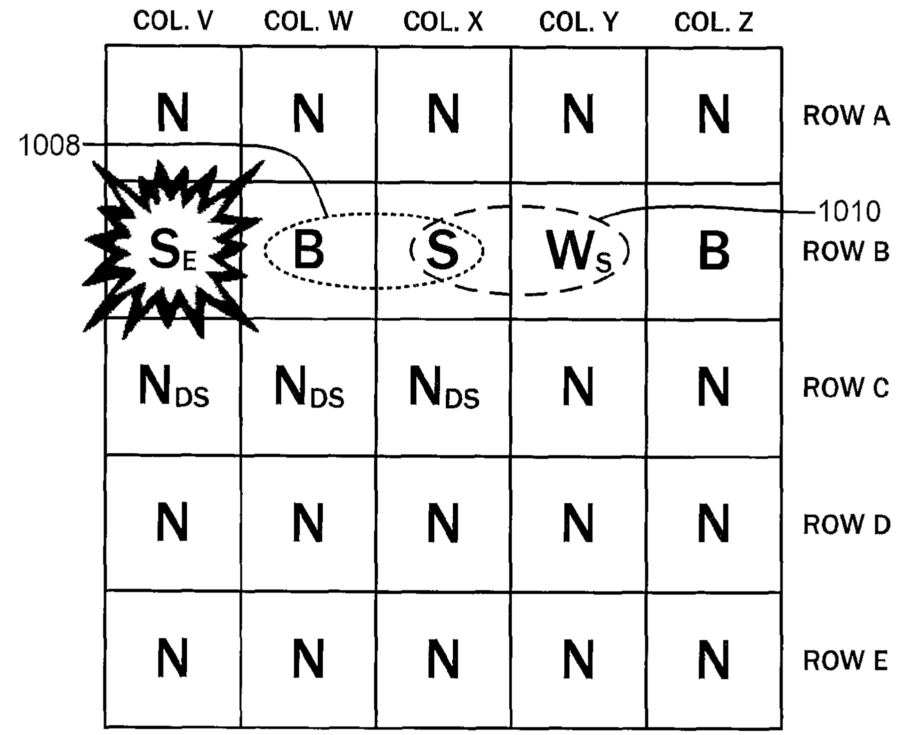
Figure 10E:
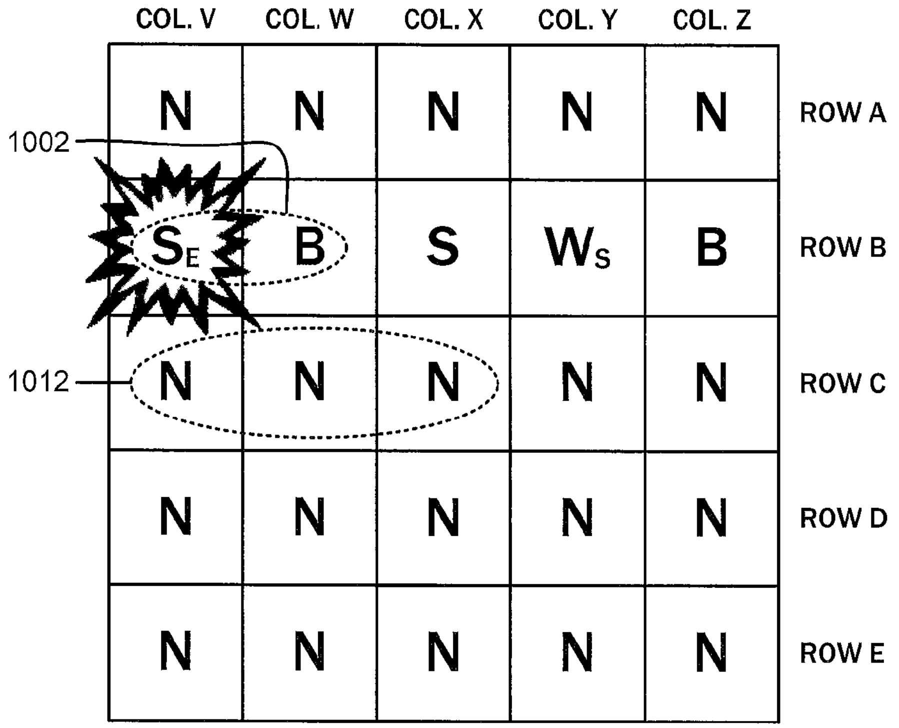
Figure 10F:
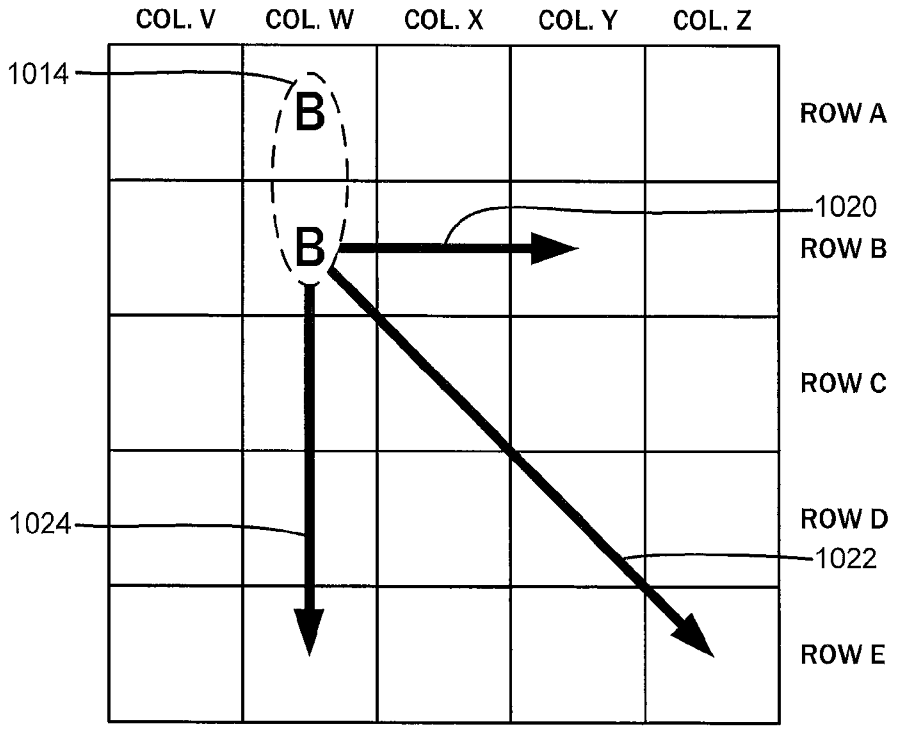

In FIG. 10C, a third blocker interaction 1006 may modify scatter into an explosive scatter 1030. In FIG. 10D, a fourth blocker interaction 1008 may limit a wild interaction 1010. Wild interaction 1010 may have modified scatter (cell represented by Row B/Col. X) into an explosive scatter. However, fourth blocker interaction 1008 may counter wild interaction 1010 which leaves the scatter unchanged. In FIG. 10E, first blocker interaction 1002 may modify dormant scatter group 1042 into a non-scatter group 1012. In FIG. 10F, a fifth blocker interaction 1014 may increase the spatial reach, direction, and/or a combination thereof for one or more blocker. For example, a first blocker reach 1020 may be two spatial units to the right. In this example, the blockers may affect any symbols in the two cells (e.g., Row B/Col. X and/or Row B/Col. Y). In another example, a second blocker reach 1022 may be three diagonal spatial units. In this example, the blockers may affect any symbols in three cells (e.g., Row C/Col. X, Row D/Col. Y, and/or Row E/Col. Z). In another example, a third blocker reach 1024 may be three spatial units down. In this example, the blockers may affect any symbols in three cells (e.g., Row C/Col. W, Row D/Col. W, and/or Row E/Col. W.

It should be noted that the blocker interaction could be changed to scatter interaction, explosive scatter interaction, wild symbol interaction, and/or any other symbol interaction to add, increase, and/or decrease a power level and/or a directional component.

Figure 11:
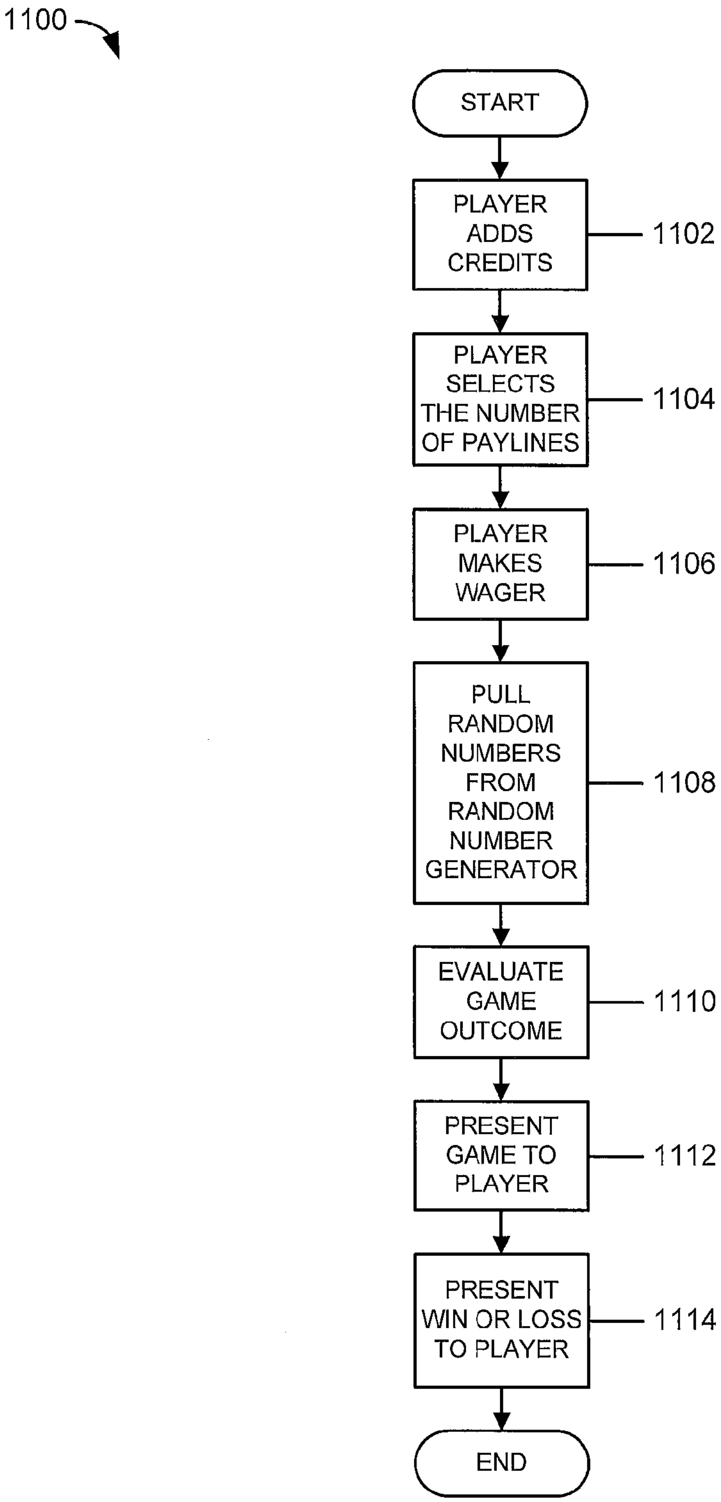
FIG. 11 is a process flowchart of game play, according to one embodiment.

In FIG. 11, a first process flowchart 1100 of game play is shown, according to one embodiment. The method may include the game play starting. The method may include the device and/or system receiving credits (step 1102). The method may include the device and/or system receiving payline selections from a player (step 1104). The method may include the device and/or system receiving a wager (step 1106). The method may include the device and/or system pulling one or more random numbers from a random number generator (step 1108). The method may include the device and/or system evaluating the game outcome (step 1110). The method may include presenting the game (step 1112). The method may include displaying the game outcome (step 1114). The method may end.

Figure 12:
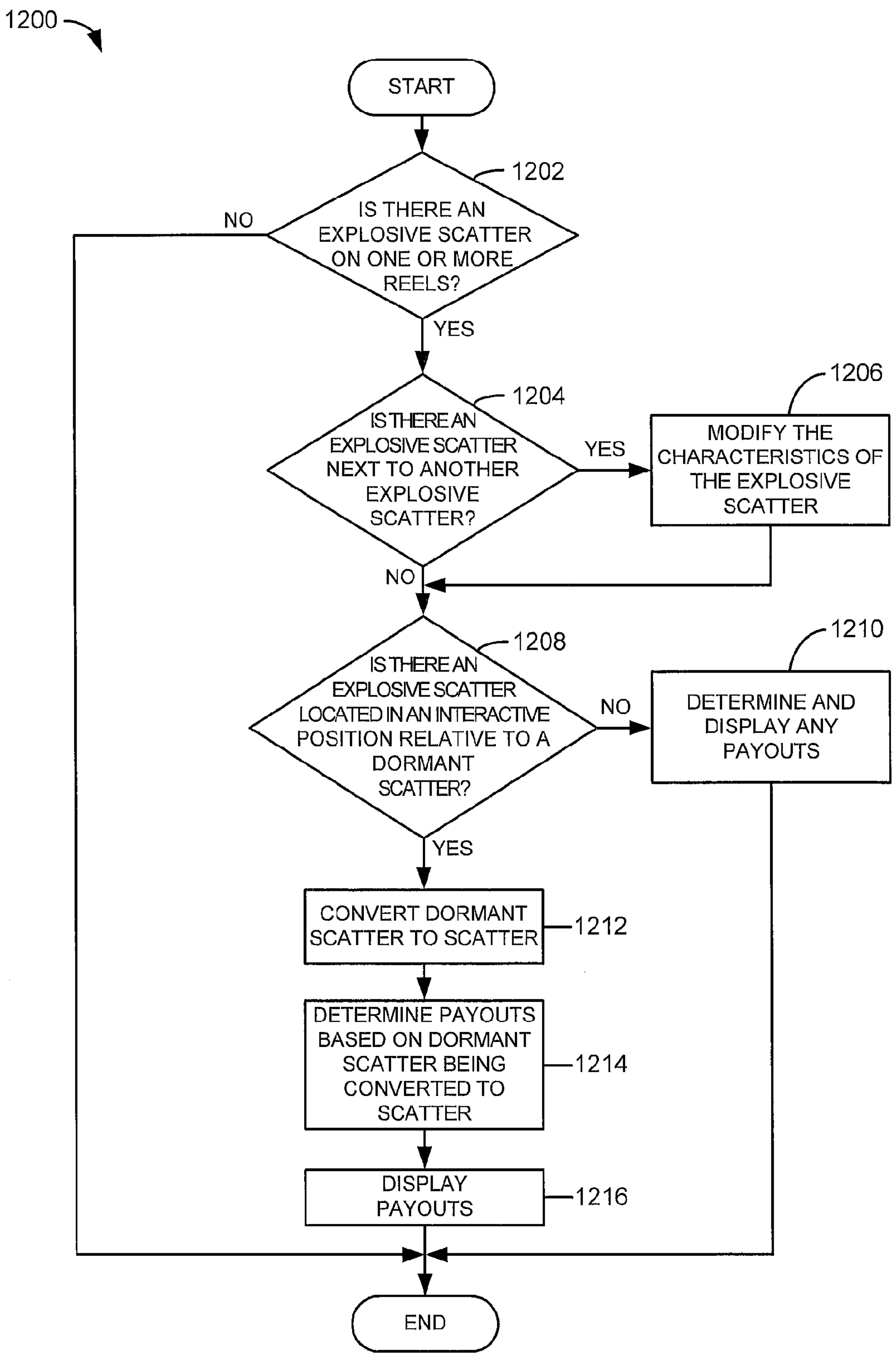
FIG. 12 is another process flowchart of game play, according to one embodiment.

FIG. 12 shows a second process flowchart 1200, according to one embodiment. The method may include starting game play. Further, the method may include the device and/or system determining whether there is an explosive scatter (and/or contagious scatters, contagious explosive scatters, dormant contagious scatters, dormant explosive scatters, scatters, and/or wilds) on one or more reels (step 1202). If there are no explosive scatters (and/or contagious scatters, contagious explosive scatters, dormant contagious scatters, dormant explosive scatters, scatters, and/or wilds) on one or more reels, the process may end. If there are explosive scatters (and/or contagious scatters, contagious explosive scatters, dormant contagious scatters, dormant explosive scatters, scatters, and/or wilds) on one or more reels, the method may include the device and/or system determining whether there is an explosive scatter (and/or contagious scatters, contagious explosive scatters, dormant contagious scatters, dormant explosive scatters, scatters, and/or wilds) next to another explosive scatter (and/or contagious scatters, contagious explosive scatters, dormant contagious scatters, dormant explosive scatters, scatters, and/or wilds). If there is not an explosive scatter (and/or contagious scatters, contagious explosive scatters, dormant contagious scatters, dormant explosive scatters, scatters, and/or wilds) next to another explosive scatter (and/or contagious scatters, contagious explosive scatters, dormant contagious scatters, dormant explosive scatters, scatters, and/or wilds), then the method moves to step 1208. If there is an explosive scatter (and/or contagious scatters, contagious explosive scatters, dormant contagious scatters, dormant explosive scatters, scatters, and/or wilds) next to another explosive scatter (and/or contagious scatters, contagious explosive scatters, dormant contagious scatters, dormant explosive scatters, scatters, and/or wilds), then the method may modify the characteristics of the explosive scatter (and/or contagious scatters, contagious explosive scatters, dormant contagious scatters, dormant explosive scatters, scatters, and/or wilds) and then the method moves to step 1208. The method may include the device and/or system determining whether there is an explosive scatter (and/or contagious scatters, contagious explosive scatters, dormant contagious scatters, dormant explosive scatters, scatters, and/or wilds) located in an interactive position relative to a dormant scatter (and/or contagious scatters, contagious explosive scatters, dormant contagious scatters, dormant explosive scatters, scatters, and/or wilds) (step 1208). If the explosive scatter (and/or contagious scatters, contagious explosive scatters, dormant contagious scatters, dormant explosive scatters, scatters, and/or wilds) is not located in an interactive position relative to a dormant scatter (and/or contagious scatters, contagious explosive scatters, dormant contagious scatters, dormant explosive scatters, scatters, and/or wilds), the method determines and display any payouts (step 1210) and the method may end. If the explosive scatter (and/or contagious scatters, contagious explosive scatters, dormant contagious scatters, dormant explosive scatters, scatters, and/or wilds) is located in an interactive position relative to a dormant scatter (and/or contagious scatters, contagious explosive scatters, dormant contagious scatters, dormant explosive scatters, scatters, and/or wilds), the method coverts a dormant scatter (and/or contagious scatters, contagious explosive scatters, dormant contagious scatters, dormant explosive scatters, scatters, and/or wilds) into a scatter (and/or contagious scatters, contagious explosive scatters, dormant contagious scatters, dormant explosive scatters, scatters, and/or wilds) (step 1212). The method may include determining one or more payouts based on the dormant scatter being converted into a scatter and/or explosive scatter (step 1214). The method may include displaying payouts (step 1216). The method may end.

Figure 13:
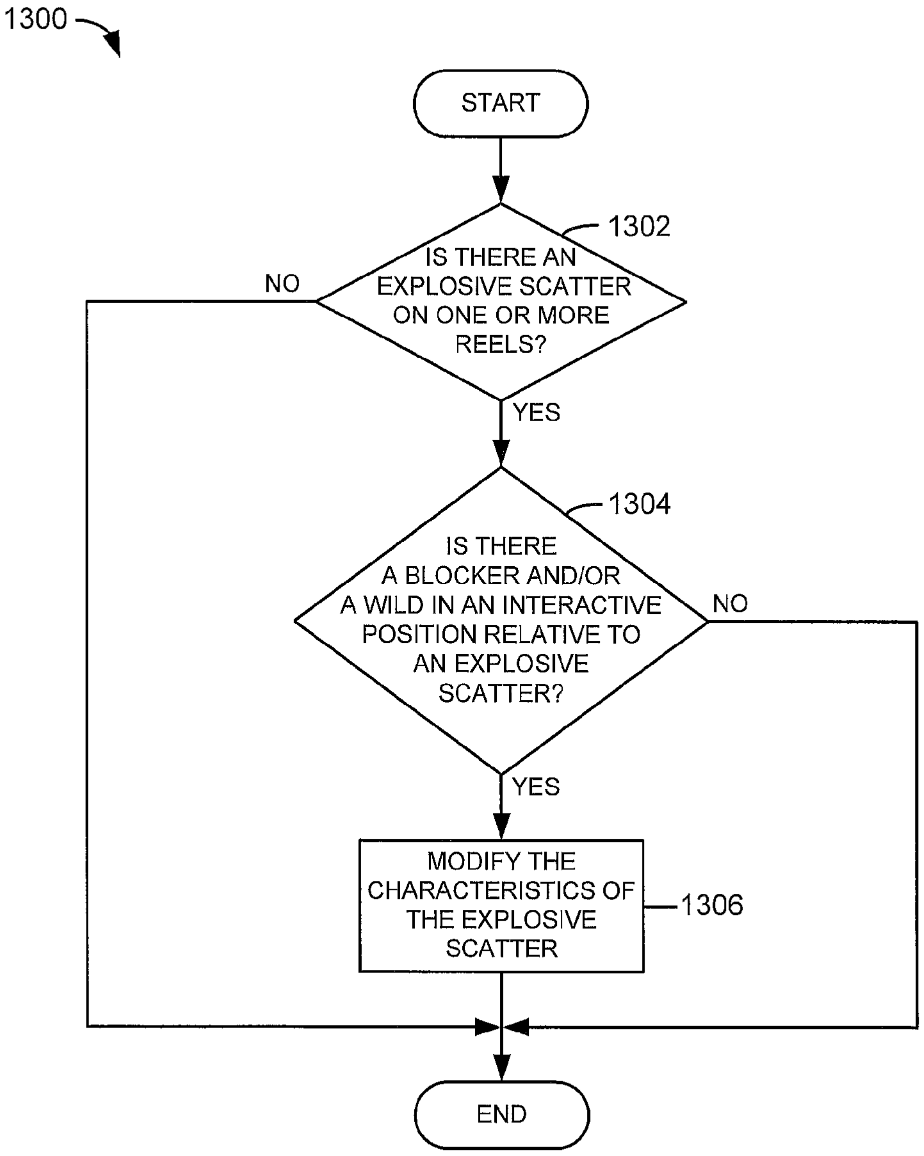
FIG. 13 is another process flowchart of game play, according to one embodiment.

FIG. 13 shows a third process flowchart 1300, according to one embodiment. The method may include starting game play. The method may include the device and/or system determining whether there is an explosive scatter (and/or contagious scatters, contagious explosive scatters, dormant contagious scatters, dormant explosive scatters, scatters, and/or wilds) on one or more reels (step 1302). If there are no explosive scatters (and/or contagious scatters, contagious explosive scatters, dormant contagious scatters, dormant explosive scatters, scatters, and/or wilds) on one or more reels, the method may end. If there are one or more explosives scatters (and/or contagious scatters, contagious explosive scatters, dormant contagious scatters, dormant explosive scatters, scatters, and/or wilds) on one or more reels, the device and/or system may determine whether there is blocker and/or a wild and/or any other interactive symbol in an interactive position relative to an explosive scatter (and/or contagious scatters, contagious explosive scatters, dormant contagious scatters, dormant explosive scatters, scatters, and/or wilds) (step 1304). If there are no blockers, wilds, and/or any other interactive symbols in an interactive position relative to an explosive scatter, the method ends. If there are blockers, wilds, and/or any other interactive symbols in an interactive position relative to an explosive scatter, then the method may modify the characteristics of the explosive scatter (step 1306).

The plurality of reels may form a 5-by-5 matrix, a 3-by-5 matrix, a 4-by-5 matrix, a 4-by-3 matrix, a 5-by-3 matrix, or any number-by-any number matrix. In the figures various symbols were utilized. N may be any non-wild symbol. $N_{ds}$ may be any dormant scatter symbol. $S_e$ may be a naturally occurring explosive scatter symbol. $C_{s\#}$ may be a symbol that generates a payout when an explosive scatter affects the symbol. $C_{ms}$ is a symbol that may affect other symbols (e.g., explosive scatters, dormant scatters, scatters, wilds, etc.). B is a symbol that may affect (minimize/downgrade/stop) other symbols (e.g., and/or contagious scatters, contagious explosive scatters, dormant contagious scatters, dormant explosive scatters, scatters, and/or wilds). W may be a wild symbol. S may be a non-expanding scatter.

In one embodiment, an explosive scatter adjacent to a symbol may generate a payout. In another embodiment, a dormant scatter (and/or scatter, wild, etc.) may turn into an explosive scatter (scatter, wild, etc.) when the dormant scatter is adjacent to an explosive scatter (and/or another dormant scatter, wild, etc.). In another embodiment, an explosive scatter on the same reel (e.g., column) as a dormant scatter (or another symbol) may turn the dormant scatter into an explosive scatter (and/or scatter, wild, etc.). In another embodiment, an explosive scatter on the same row as a dormant scatter may turn the dormant scatter into an explosive scatter symbol (and/or a scatter, wild, etc.). In another embodiment, an explosive scatter on the same payline as a dormant scatter may turn the dormant scatter into an explosive scatter symbol (and/or a scatter, dormant explosive scatter, wild, etc.). In should be noted that any symbol in these examples can be replaced by any other symbol. For example, the dormant scatter may be replaced with a dormant explosive scatter.

In one embodiment, a process may randomly generate various symbols on a matrix of symbols which produces an outcome (e.g., winning combination or losing combination). The outcome may be determined by the combination of symbols which are along predefined paylines. These symbols may be designated as a wild symbol which may be substituted for any other symbol to create a winning combination. In another embodiment, the process may convert non-scatter symbols to scatter symbols by designating one or more such symbols as dormant scatters that only become scatters under specific conditions and interactions. Scatters may generate payout independently of the paylines utilized on the device and/or system.

In various embodiments, these conversions may be based on adjacent logic, optional chain reaction logic, mandatory chain reaction logic, varying chain reaction logic, random logic, varying logic, directional logic, pathway logic, and/or any combination thereof. In another embodiment, a dormant scatter (and/or other symbol) may turn into one or more forms of a scatter (e.g., and/or contagious scatters, contagious explosive scatters, dormant contagious scatters, dormant explosive scatters, scatters, and/or wilds) when the dormant scatter lands adjacent to a naturally occurring scatter (e.g., contagious scatters, contagious explosive scatters, dormant contagious scatters, scatters, and/or dormant explosive scatters).

In another embodiment, a dormant scatter (or dormant explosive scatter) may turn into a scatter and/or explosive scatter if an adjacent dormant scatter symbol turns into an explosive scatter, scatter, and/or wild. In another embodiment, a dormant scatter may turn into a scatter and/or explosive scatter if a naturally occurring scatter (e.g., scatter and/or explosive scatter) appears anywhere on the same vertical column. In another embodiment, a dormant scatter may turn into a scatter and/or explosive scatter if a naturally occurring scatter (e.g., scatter and/or explosive scatter) appears anywhere on the same horizontal row. In another embodiment, a dormant scatter may turn into a scatter and/or explosive scatter if a naturally occurring scatter (e.g., scatter and/or explosive scatter) appears anywhere on the same payline. In another embodiment, a dormant scatter may turn into a scatter and/or explosive scatter spontaneously and apparently at random. In another embodiment, a dormant scatter may turn into a scatter and/or explosive scatter whenever certain advertised conditions are met.

In one example, the electronic gaming device may include a plurality of reels. The plurality of reels may include one or more areas. The electronic gaming device may include a memory and a processor. The processor may generate one or more symbols to be located in the one or more areas. The one or more symbols may include a first expanding scatter symbol and a first dormant scatter symbol. The processor may modify the first dormant scatter symbol into an award value based on a first interaction determination.

In another example, the award value may be one or more of a credit amount, a free-spin number, and/or a multiplier value.

In an example, the first interaction determination may be based on a first expanding scatter symbol location and a first dormant scatter symbol location. This first interaction determination or any other interaction determination may be on a relative location basis, a predetermined area, and/or any other relationship.

In one embodiment, the first interaction determination may be that the first expanding scatter symbol location is one area away from the first dormant scatter symbol location. In another example, the processor may modify a first expanding scatter symbol characteristic based on a second interaction determination. The second interaction determination may be based on a first expanding scatter symbol location and a second expanding scatter symbol location. In another example, the second interaction determination may be that the first expanding scatter symbol location is one area away from the second expanding scatter symbol location.

In an embodiment, the processor may modify one or more of a first expanding scatter symbol characteristic, a first dormant scatter symbol characteristic, a non-expanding scatter characteristic, and/or a second expanding scatter symbol characteristic based on a third interaction determination.

In various examples, the third interaction determination may be based on one or more of: a first expanding scatter symbol location and a first dormant scatter symbol location; a first expanding scatter symbol location and a second expanding scatter symbol location; the first dormant scatter symbol location and the second expanding scatter symbol location;

the first expanding scatter symbol location and a non-expanding scatter symbol location; the first dormant scatter symbol location and the non-expanding scatter symbol location; and the non-expanding scatter symbol location and the second expanding scatter symbol location.

In another embodiment, the third interaction determination may be based on one or more of: the first expanding scatter symbol location is two areas away from the first dormant scatter symbol location; the first expanding scatter symbol location is two areas away from the second expanding scatter symbol location; the first expanding scatter symbol location is two areas away for the non-expanding scatter symbol location; the first dormant scatter symbol location is two areas away from the non-expanding scatter symbol location; the second expanding scatter symbol location is two areas away from the non-expanding scatter symbol location; and/or the first dormant scatter symbol location is two areas away from the second expanding scatter symbol location.

In one embodiment, the method of providing gaming options via an electronic gaming device may include displaying a first expanding scatter symbol and displaying a first dormant scatter symbol. The method may further include determining a first interaction between the first expanding scatter symbol and the first dormant scatter symbol. In addition, the method may include modifying the first dormant scatter symbol based on the first interaction.

In another example, the first interaction determination may be based on a first expanding scatter symbol location and a first dormant scatter symbol location. The first interaction determination may be that the first expanding scatter symbol location is one area away from the first dormant scatter symbol location. The method may further include modifying a first expanding scatter symbol characteristic based on a second interaction determination.

In an example, the second interaction determination may be based on a first expanding scatter symbol location and a second expanding scatter symbol location. In another example, the second interaction determination may be that the first expanding scatter symbol location is one area away from the second expanding scatter symbol location.

In one embodiment, the electronic gaming system may include a server which includes a server memory and a server processor. The server processor may display a plurality of reels which include one or more symbols. The one or more symbols may include a first expanding scatter symbol and a first dormant scatter symbol. The server processor may modify the first dormant scatter symbol into an award value based on a first interaction determination.

The first interaction determination may be based on a first expanding scatter symbol location and a first dormant scatter symbol location. The first interaction determination may be that the first expanding scatter symbol location is one area away from the first dormant scatter symbol location.

The server processor may modify a first expanding scatter symbol characteristic based on a second interaction determination.

In one embodiment, the electronic gaming device may include a plurality of reels. The plurality of reels may include one or more areas. The electronic gaming device may include a memory and one or more processors. The one or more processors may generate one or more symbols to be located in the one or more areas. The one or more symbols may include a first directional expanding scatter symbol and a first dormant scatter symbol. The one or more processors may modify the first dormant scatter symbol into an award value based on a first interaction determination.

In another example, the award value may be a modified symbol, a credit amount, a free-spin number, and/or a multiplier value. In another example, the first interaction determination may be based on a first directional expanding scatter symbol location and a first dormant scatter symbol location. In another example, the first interaction determination may be that the first directional expanding scatter symbol location is one area away from the first dormant scatter symbol location. In one example, the one or more processors may modify a first directional expanding scatter symbol characteristic based on a second interaction determination. In another example, the second interaction determination may be based on a first directional expanding scatter symbol location and an expanding scatter symbol location. In one example, the second interaction determination may be that the first directional expanding scatter symbol location is one area away from the expanding scatter symbol location. In an example, the one or more processors may modify at least one of a first directional expanding scatter symbol characteristic, a first dormant scatter symbol characteristic, a non-expanding scatter characteristic, and an expanding scatter symbol characteristic based on a third interaction determination. In an example, the third interaction determination may be based on at least one of a first directional expanding scatter symbol location and a first dormant scatter symbol location, a first directional expanding scatter symbol location and an expanding scatter symbol location, the first dormant scatter symbol location and the expanding scatter symbol location, the first directional expanding scatter symbol location and a non-expanding scatter symbol location, the first dormant scatter symbol location and the non-expanding scatter symbol location, and the non-expanding scatter symbol location and the expanding scatter symbol location. In another example, the third interaction determination may be that the first directional expanding scatter symbol location is two areas away from the first dormant scatter symbol location, the first directional expanding scatter symbol location is two areas away from the expanding scatter symbol location, the first directional expanding scatter symbol location is two areas away for the non-expanding scatter symbol location, the first dormant scatter symbol location is two areas away from the non-expanding scatter symbol location, the expanding scatter symbol location is two areas away from the non-expanding scatter symbol location, and/or the first dormant scatter symbol location is two areas away from the expanding scatter symbol location.

In another embodiment, the method of providing gaming options via an electronic gaming device may include displaying a first directional expanding scatter symbol. The method may include displaying a first dormant scatter symbol. The method may include determining a first interaction between the first directional expanding scatter symbol and the first dormant scatter symbol. The method may include modifying the first dormant scatter symbol based on the first interaction.

In another example, the first interaction determination may be based on a first directional expanding scatter symbol location and a first dormant scatter symbol location. In one example, the first interaction determination may be that the first directional expanding scatter symbol location is one area away from the first dormant scatter symbol location. In an example, the method may include modifying a first directional expanding scatter symbol characteristic based on a second interaction determination. In another example, the second interaction determination may be based on a first directional expanding scatter symbol location and an expanding scatter symbol location. In one example, the second interaction determination may be that the first directional expanding scatter symbol location is one area away from the expanding scatter symbol location.

In another embodiment, the electronic gaming system may include a server which includes a server memory and a server processor. The server processor may display a plurality of reels which include one or more symbols. The one or more symbols may include a first directional expanding scatter symbol and a first dormant scatter symbol. The server processor may modify the first dormant scatter symbol into an award value based on a first interaction determination.

In another example, the first interaction determination may be based on a first directional expanding scatter symbol location and a first dormant scatter symbol location. In one example, the first interaction determination may be that the first directional expanding scatter symbol location is one area away from the first dormant scatter symbol location. In an example, the server processor may modify a first directional expanding scatter symbol characteristic based on a second interaction determination.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a credit device configured to accept an item associated with a monetary value;

a plurality of display areas, the plurality of display areas configured to display one or more symbols in one or more symbol areas;

a memory;

a user input device configured to enable a player to select a wager amount and initiate a game play where the wager amount is subtracted from a credit balance, the credit balance being funded at least in part via the credit device;

a processor configured to display the one or more symbols in the one or more symbol areas, the one or more symbols include a first directional expanding scatter symbol and a first dormant scatter symbol, the processor configured to modify the first dormant scatter symbol into a first award value based on a first interaction determination and the processor configured to modify the first dormant scatter symbol into a second award value based on a second interaction determination where the first interaction determination is based on a first spatial determination between the first directional expanding scatter symbol and the first dormant scatter symbol and the second interaction determination is based on a second spatial determination between the first directional expanding scatter symbol and the first dormant scatter symbol, where the first spatial determination is based on both a first horizontal distance determination and a first vertical distance determination and the second spatial determination is based on both a second horizontal distance determination and a second vertical distance determination.

2. The electronic gaming device of claim 1, wherein the first award value is at least one of a modified symbol, a credit amount, a free-spin, and a multiplier value.

3. The electronic gaming device of claim 1, wherein the first interaction determination is based on a first directional expanding scatter symbol location and a first dormant scatter symbol location.

4. The electronic gaming device of claim 3, wherein the first interaction determination is that the first directional expanding scatter symbol location is one area away from the first dormant scatter symbol location.

5. The electronic gaming device of claim 1, wherein the processor is further configured to generate a first directional expanding scatter symbol presentation based on the second interaction determination.

6. The electronic gaming device of claim 5, wherein the second interaction determination is based on a first directional expanding scatter symbol location and an expanding scatter symbol location.

7. The electronic gaming device of claim 6, wherein the second interaction determination is that the first directional expanding scatter symbol location is one area away from the expanding scatter symbol location.

8. The electronic gaming device of claim 1, wherein the processor is further configured to modify at least one of a first directional expanding scatter symbol characteristic, a first dormant scatter symbol characteristic, a non-expanding scatter characteristic, and an expanding scatter symbol characteristic based on a third interaction determination.

9. The electronic gaming device of claim 8, wherein the third interaction determination is based on at least one of a first directional expanding scatter symbol location and a first dormant scatter symbol location, a first directional expanding scatter symbol location and an expanding scatter symbol location, the first dormant scatter symbol location and the expanding scatter symbol location, the first directional expanding scatter symbol location and a non-expanding scatter symbol location, the first dormant scatter symbol location and the non-expanding scatter symbol location, and the non-expanding scatter symbol location and the expanding scatter symbol location.

10. The electronic gaming device of claim 9, wherein the third interaction determination is at least one of that the first directional expanding scatter symbol location is two areas away from the first dormant scatter symbol location, the first directional expanding scatter symbol location is two areas away from the expanding scatter symbol location, the first directional expanding scatter symbol location is two areas away for the non-expanding scatter symbol location, the first dormant scatter symbol location is two areas away from the non-expanding scatter symbol location, the expanding scatter symbol location is two areas away from the non-expanding scatter symbol location, and the first dormant scatter symbol location is two areas away from the expanding scatter symbol location.

11. A method of providing gaming options via an electronic gaming device comprising:

receiving via a credit device an item associated with a monetary value;

establishing via one or more processors a credit balance based at least in part on the received item;

receiving via a wager button a wager amount on a play of a game, wherein the wager amount is deducted from the credit balance;

displaying via the one or more processors a first directional expanding scatter symbol;

displaying via the one or more processors a first dormant scatter symbol;

determining via the one or more processors a first interaction between the first directional expanding scatter symbol and the first dormant scatter symbol;

modifying via the one or more processors the first dormant scatter symbol into a first award value based on the first interaction determination; and modifying the first dormant scatter symbol into a second award value based on a second interaction determination where the first interaction determination is based on a first spatial determination between the first directional expanding scatter symbol and the first dormant scatter symbol and the second interaction determination is based on a second spatial determination between the first directional expanding scatter symbol and the first dormant scatter symbol, where the first spatial determination is based on both a first horizontal distance determination and a first vertical distance determination and the second spatial determination is based on both a second horizontal distance determination and a second vertical distance determination.

12. The method of claim 11, wherein the first interaction determination is based on a first directional expanding scatter symbol location and a first dormant scatter symbol location.

13. The method of claim 12, wherein the first interaction determination is that the first directional expanding scatter symbol location is one area away from the first dormant scatter symbol location.

14. The method of claim 11, further comprising modifying a first directional expanding scatter symbol characteristic based on the second interaction determination.

15. The method of claim 14, wherein the second interaction determination is based on a first directional expanding scatter symbol location and an expanding scatter symbol location.

16. The method of claim 15, wherein the second interaction determination is that the first directional expanding scatter symbol location is one area away from the expanding scatter symbol location.

17. An electronic gaming system comprising:

a credit device configured to accept an item associated with a monetary value;

a user input device configured to enable a player to select a wager amount and initiate a game play, wherein the wager amount is subtracted from a credit balance funded at least in part via the credit device;

a server including a server memory and a server processor, the server processor configured to display a plurality of reels which include one or more symbols, the one or more symbols include a first directional expanding scatter symbol and a first dormant scatter symbol; and the server processor configured to modify the first dormant scatter symbol into a first award value based on a first interaction determination and the server processor configured to modify the first dormant scatter symbol into a second award value based on a second interaction determination where the first interaction determination is based on a first spatial determination between the first directional expanding scatter symbol and the first dormant scatter symbol and the second interaction determination is based on a second spatial determination between the first directional expanding scatter symbol and the first dormant scatter symbol, where the first spatial determination is based on both a first horizontal distance determination and a first vertical distance determination and the second spatial determination is based on both a second horizontal distance determination and a second vertical distance determination.

18. The electronic gaming system of claim 17, wherein the first interaction determination is based on a first directional expanding scatter symbol location and a first dormant scatter symbol location.

19. The electronic gaming system of claim 18, wherein the first interaction determination is that the first directional expanding scatter symbol location is one area away from the first dormant scatter symbol location.

20. The electronic gaming system of claim 17, wherein the server processor is further configured to modify a first directional expanding scatter symbol characteristic based on the second interaction determination.

* * * * *